(12) United States Patent
Zhou et al.

(10) Patent No.: US 9,268,056 B2
(45) Date of Patent: Feb. 23, 2016

(54) NEUTRON POROSITY BASED ON ONE OR MORE GAMMA RAY DETECTORS AND A PULSED NEUTRON SOURCE

(71) Applicant: Schlumberger Technology Corporation, Sugar Land, TX (US)

(72) Inventors: Tong Zhou, Sugar Land, TX (US); David Rose, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 119 days.

(21) Appl. No.: 13/851,872

(22) Filed: Mar. 27, 2013

(65) Prior Publication Data

US 2014/0042311 A1 Feb. 13, 2014

Related U.S. Application Data

(60) Provisional application No. 61/616,446, filed on Mar. 28, 2012.

(51) Int. Cl.
*G01V 5/10* (2006.01)

(52) U.S. Cl.
CPC ............. *G01V 5/102* (2013.01); *G01V 5/101* (2013.01)

(58) Field of Classification Search
CPC .................................................. G01V 5/125
USPC .................................................. 250/269.8
See application file for complete search history.

(56) References Cited

U.S. PATENT DOCUMENTS

| 5,293,410 | A | 3/1994 | Chen et al. | |
| 5,699,246 | A * | 12/1997 | Plasek et al. | 702/11 |
| 6,703,606 | B2 | 3/2004 | Adolph | |
| 6,754,586 | B1 | 6/2004 | Adolph et al. | |
| 6,884,994 | B2 | 4/2005 | Simonetti et al. | |
| 2006/0226351 | A1* | 10/2006 | Stoller et al. | 250/269.1 |
| 2011/0001040 | A1 | 1/2011 | Smith, Jr. et al. | |
| 2011/0213555 | A1 | 9/2011 | Kopal et al. | |
| 2013/0105678 | A1* | 5/2013 | Wilson et al. | 250/254 |

OTHER PUBLICATIONS

Ellis, et al., "Well Logging for Earth Scientists", 2nd Edition, Springer, 2007, 699 pages.
International Search Report and Written Opinion issued in PCT/US2013/034343 on Jul. 11, 2013, 8 pages.

* cited by examiner

*Primary Examiner* — David J Makiya
*Assistant Examiner* — Kenneth J Malkowski
(74) *Attorney, Agent, or Firm* — Michael Dae

(57) ABSTRACT

A method for pulsed neutron well logging of a subsurface formation, includes irradiating the formation with a plurality of bursts of neutrons of a group of selected durations; detecting gamma rays resulting from interaction of the neutrons during a group of selected time gates which contains at least some early and late gamma ray counts. The gamma rays are detected at at least two axially spaced apart locations from a position of the irradiating. A weighted sum of the numbers of gamma rays detected in each of the time gates is calculated. A ratio of the weighted sum of detected gamma rays at a first axial spacing to the weighted sum at a second axial spacing is determined. The ratio is used to determine a hydrogen index of the subsurface formation.

8 Claims, 25 Drawing Sheets

Compute TRat

Define time gate ⎯ 50

↓

The selected time gates are a group of selected time bins in FIG. 7.

↓

For example, it can be all the time bins during neutron burst off time, except the time bons within a short delay after every neutron burst (can be 10 to 15 us). See FIG. 20.

Compute TRat ⎯ 52

↓

For example, TRat can be the weighted sum of the detected gamma rays in all the selected time gates of the detector 1 divided by the weighted sum of the detected gamma rays in the selected time gates of the detector 2.

↓

With optimal time gates and weights, TRat is substantially free of borehole salinity effects.

FIG. 19

NEUTRON POROSITY BASED ON ONE OR MORE GAMMA RAY DETECTORS AND A PULSED NEUTRON SOURCE

CROSS-REFERENCE TO RELATED APPLICATIONS

Priority is claimed from U.S. Provisional Application No. 61/616,446 filed on Mar. 28, 2012, which is incorporated herein by reference in its entirety.

STATEMENT REGARDING FEDERALLY SPONSORED RESEARCH OR DEVELOPMENT

Not applicable.

BACKGROUND

The invention relates generally to the field of measurements of subsurface formation properties using pulsed neutrons as an energy source. More specifically, the invention relates to determining fractional volume of pore space (porosity) of subsurface formations using a pulsed neutron source and at least one gamma ray radiation detectors.

Subsurface formation HI (hydrogen index) measurement using high energy neutrons as a measurement source has been used in well logging since at least the 1950s. In case of no bound-water in the formation matrix (such as shale), hydrogen atoms only appear in the pore space (oil or water). Thus, the formation hydrogen index is typically a measurement of formation porosity. Neutron source based porosity measurements known in the art rely on the fact that the slowing down of neutrons, and therefore the average distance travelled within the formations by the neutrons, is strongly dependent on the hydrogen content of the formation. The hydrogen content dependency is due to the fact that neutrons can incur a very large energy loss in a single elastic scattering event with a proton (a hydrogen nucleus). In its simplest form, neutron based porosity measurement can be performed using a neutron source and a detector axially spaced from the neutron source. If the axial spacing of the detector from the source is chosen appropriately, then the neutron flux at the detector location will decrease monotonically with increasing formation hydrogen content. As one possible alternative, the neutron detector can be replaced by a gamma-ray detector, since the flux of neutron induced gamma-rays is related to the neutron flux.

Early versions of neutron-based porosity measurement instruments included those having a single gamma-ray detector (e.g., a Geiger-Mueller counter) with a radioisotope-based neutron source (e.g., $^{241}$AmBe, $^{238}$PuBe). Such instruments may be referred to as "neutron-gamma" instruments. Correspondingly, instruments using a neutron detector (e.g., a $^3$He proportional counter) may be referred to as "neutron-neutron" instruments. Traditionally, the term "neutron porosity" typically means a neutron-based porosity measurement using a $^{241}$AmBe source and "neutron-neutron" instruments. The following terms are defined in order to differentiate this work from the traditional "neutron porosity". "Neutron-neutron porosity" may be defined as neutron porosity based on a neutron source and neutron detectors. Similarly, "neutron-gamma porosity" may be defined as neutron porosity based on a neutron source and gamma ray detectors, which is the scope of this invention.

Both neutron-neutron instrument measurements and to an even larger extent neutron-gamma instrument measurements are strongly affected by a multitude of environmental effects. Most, if not all open-hole neutron tools used at the present time are neutron-neutron measurements based on the detection of the thermal and/or epithermal neutron flux at one or more neutron detectors.

It can be more difficult to measure formation HI based on gamma ray detectors as compared to using neutron detectors. In addition to other phenomena, gamma ray detectors measure the gamma rays from neutron "capture" interaction (i.e., capture of a thermal neutron by a nucleus of certain atoms having large "neutron capture cross section" and subsequent emission of a gamma ray) in the formation, wellbore or the instrument itself. Capture gamma ray measurement is therefore an indirect measurement the presence of neutrons. The physics of neutron-neutron porosity only involves neutron transport from the source to the neutron detector. The physics of neutron gamma porosity involves both neutron and gamma ray transport, so that such physics are more complex. Thus, neutron-gamma porosity may have more environmental effects which may be more difficult to interpret.

Notwithstanding the additional complexity in interpretation there may be advantages associated with measuring neutron-gamma porosity. The count rate of a gamma ray detector can be more than 1 order of magnitude higher than a $^3$He neutron detector. The depth of investigation (lateral distance from the wellbore wall into the formation) of a neutron-gamma measurement may be deeper than that of a neutron-neutron measurement. The energy of a gamma ray from a neutron capture event is normally in the million electron volt (MeV) range, which means such gamma rays can travel a longer distance than a thermal neutron before absorption. A scintillation type gamma ray detector can also provide gamma ray spectroscopy and inelastic neutron scatter-related measurements, which a thermal or epithermal neutron detector cannot. The foregoing features make neutron-gamma porosity very appealing. Thus is it desirable to have an improved neutron-gamma porosity instrument.

SUMMARY

A method for pulsed neutron well logging of a subsurface formation, includes irradiating the formation with a plurality of bursts of neutrons of a group of selected durations; detecting gamma rays resulting from interaction of the neutrons during a group of selected time gates which contains at least some early and late gamma ray counts. The gamma rays are detected at at least two axially spaced apart locations from a position of the irradiating. In a preferred embodiment, a weighted sum of the numbers of gamma rays detected in each of the time gates is calculated. A ratio of the weighted sum of detected gamma rays at a first axial spacing to the weighted sum at a second axial spacing is determined. The ratio is used to determine a hydrogen index of the subsurface formation.

Other aspects and advantages will be apparent from the description and claims which follow.

BRIEF DESCRIPTION OF THE DRAWINGS

FIG. 19. Shows how to compute TRat from gamma ray counts measured in selected time windows.

DETAILED DESCRIPTION

Figure 1:
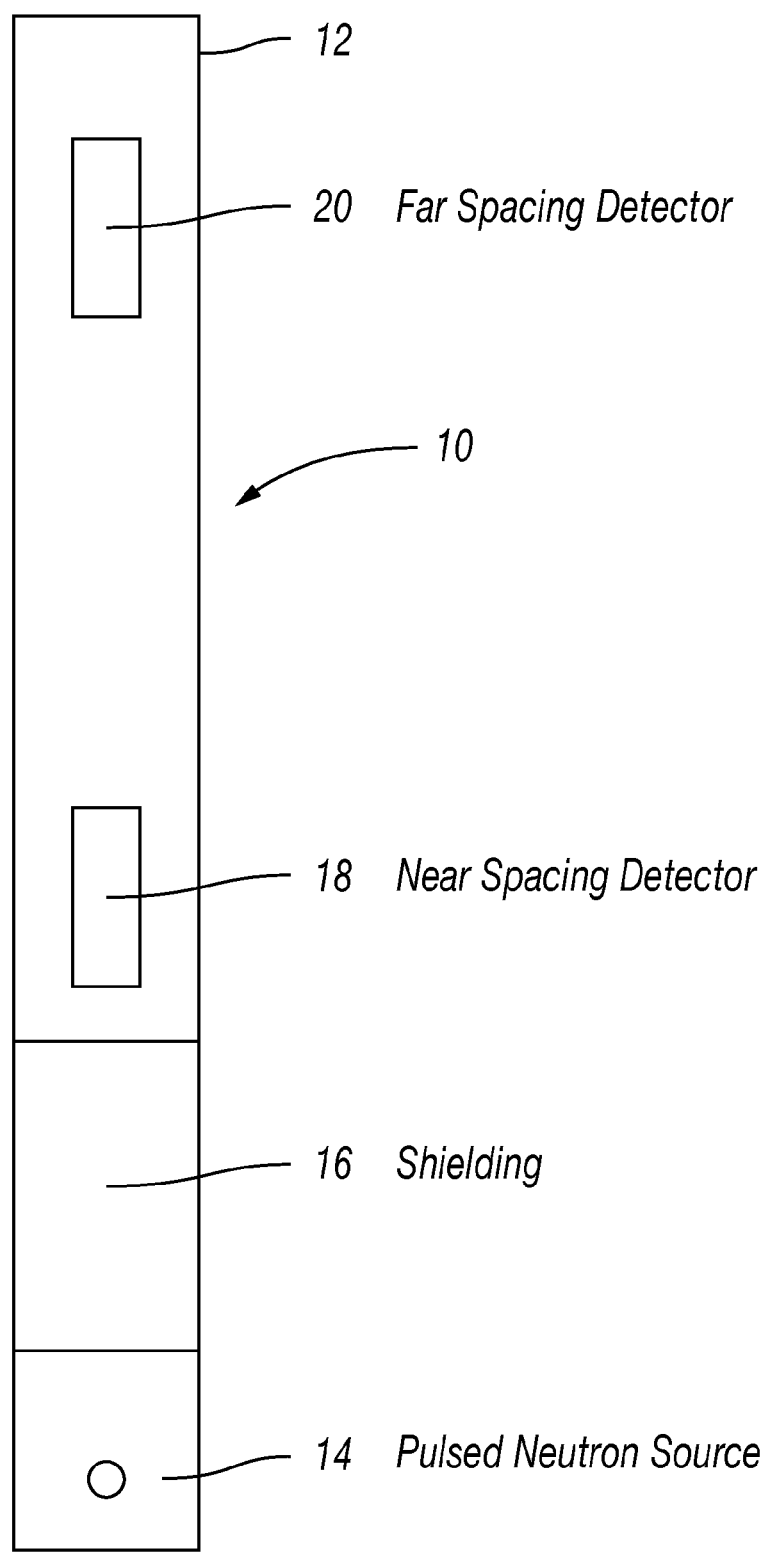
FIG. 1 shows an example neutron-gamma well logging instrument using a "pulsed" neutron source.

FIG. 1 shows an example "neutron-gamma porosity" well logging instrument 10. The measurement components of the instrument 10 may be disposed in a housing 12 shaped and sealed to be moved along the interior of a wellbore. The pulsed neutron well logging instrument 10 may, in a form hereof, be of a type described, for example, in U.S. Pat. No. 5,699,246.

The instrument housing 12 contains a pulsed neutron source 14, and two or more gamma ray detectors 18, 20 at different axial spacings from the pulsed neutron source. The pulsed neutron source 14 (hereinafter "source"), when activated, will emit controlled duration "bursts" of high energy neutrons (approximately 14 MeV, and which may be emitted isotropically). One example of a pulsed neutron source is described in U.S. Pat. No. 5,293,410 issued to Chen et al. and incorporated herein by reference.

Shielding 16 may be interposed between the source 14 and the axially closest detector (e.g., 16) to reduce the effects of direct neutron communication between the source 14 and the detectors 18, 20. The detectors 18, 20 may be scintillation counters each coupled to a respective counter or pulse height analyzer (not shown separately). Thus, numbers of and, with the use of a pulse height analyzer, energy of detected gamma rays may be characterized at each of a plurality of distances from the source 14.

The gamma ray detectors 18, 20 may detect gamma rays arriving at the detector as a function of time. There are two principal mechanisms, through which a neutron-induced gamma ray can be generated. One is neutron inelastic scattering, which can be triggered only by "fast" neutrons (with energy above approximately 1 MeV, the exact energy threshold depending on the type of nucleus). The other is through neutron capture, which can be triggered primarily by thermal neutrons (with energy around 0.025 eV at room temperature) or epithermal neutrons (with energy from about 0.4 to 100 eV) being absorbed into a susceptible nucleus, as non-limiting examples, chlorine, boron and cadmium. When the source 14 is activated, the gamma rays arriving at the detectors 18, 20 may be generated through both mechanisms because the source keeps emitting fast neutrons which can slow down to epithermal or thermal almost instantly (relative to the acquisition system timing). When the source 14 is switched off, the gamma rays arriving at the detectors 18, 20 may only be generated by epithermal or thermal neutron capture because no new fast neutrons are emitted into the wellbore and formations. Thus, the measured gamma ray flux at the detectors 18, 20 during the source off time is an indirect measurement of epithermal and thermal neutrons. Such indirect measurement can be used to provide formation hydrogen index (HI) measurement.

A well logging instrument including a scintillation detector type radiation counter is ordinarily used in a procedure to make measurements of properties of subsurface Earth formations penetrated by a wellbore. The wellbore is drilled through the formations. The wellbore may be filled with liquid called "drilling mud" during the drilling and well logging procedure, or some form of brine or other completion fluid after wellbore construction is completed. The well logging procedure includes lowering the well logging instrument into the wellbore. The instrument may be attached to one end of an armored electrical cable. The cable is extended into the wellbore by a winch or similar spooling device to lower the instrument into the wellbore. The winch may then be operated to withdraw the cable from the wellbore while various sensors (to be further explained) in the instrument make measurements of various properties of the formations penetrated by the wellbore. Electrical power may be transmitted along the cable from the surface to operate the instrument. Signals corresponding to the measurements made by the various sensors in the instrument (explained above with reference to FIG. 1) may be transmitted along the cable for recording and/or interpretation in a recording unit at the Earth's surface, or in a computer system as will be explained with reference to FIG. 23

The present example of the well logging instrument may be an instrument that makes measurements corresponding to selected properties of the Earth formations based on spectral analysis of detected gamma rays. Such instruments include a housing in which is disposed certain electronic circuitry, to be further explained below. The housing may or may not include a backup pad or arm that is biased to one side of the instrument to urge the other side of the instrument into contact with the wall of the wellbore. The other side of the instrument may or may not include a tungsten or similar high density skid or pad in which is disposed a source radiation, which may be a pulsed neutron source as explained with reference to FIG. 1 above. Although the example instrument includes various components disposed in a skid or pad, in other examples, the components may be disposed entirely within the instrument housing as shown in FIG. 1.

One or more radiation detectors (e.g., as explained with reference to FIG. 1) including a scintillation detector crystal optically coupled to a photomultiplier may be disposed in the pad. A controllable high voltage power supply is coupled to the photomultiplier to enable photons applied thereto to be converted to voltage pulses as will be familiar to those skilled in the art. The voltage output of the high voltage power supply can be controlled by a controller forming part of the circuitry to cause the high voltage supply maintain a suitable voltage on the photomultiplier.

While the example conveyance of a well logging instrument uses armored electrical cable, the foregoing is not intended to limit the scope of instrument conveyance according to the disclosure. Any known means of conveyance may be used in other examples, including, without limitation, as part of a drill string as a logging while drilling (LWD) instrument, conveyed by coiled tubing or slickline.

Figure 2:
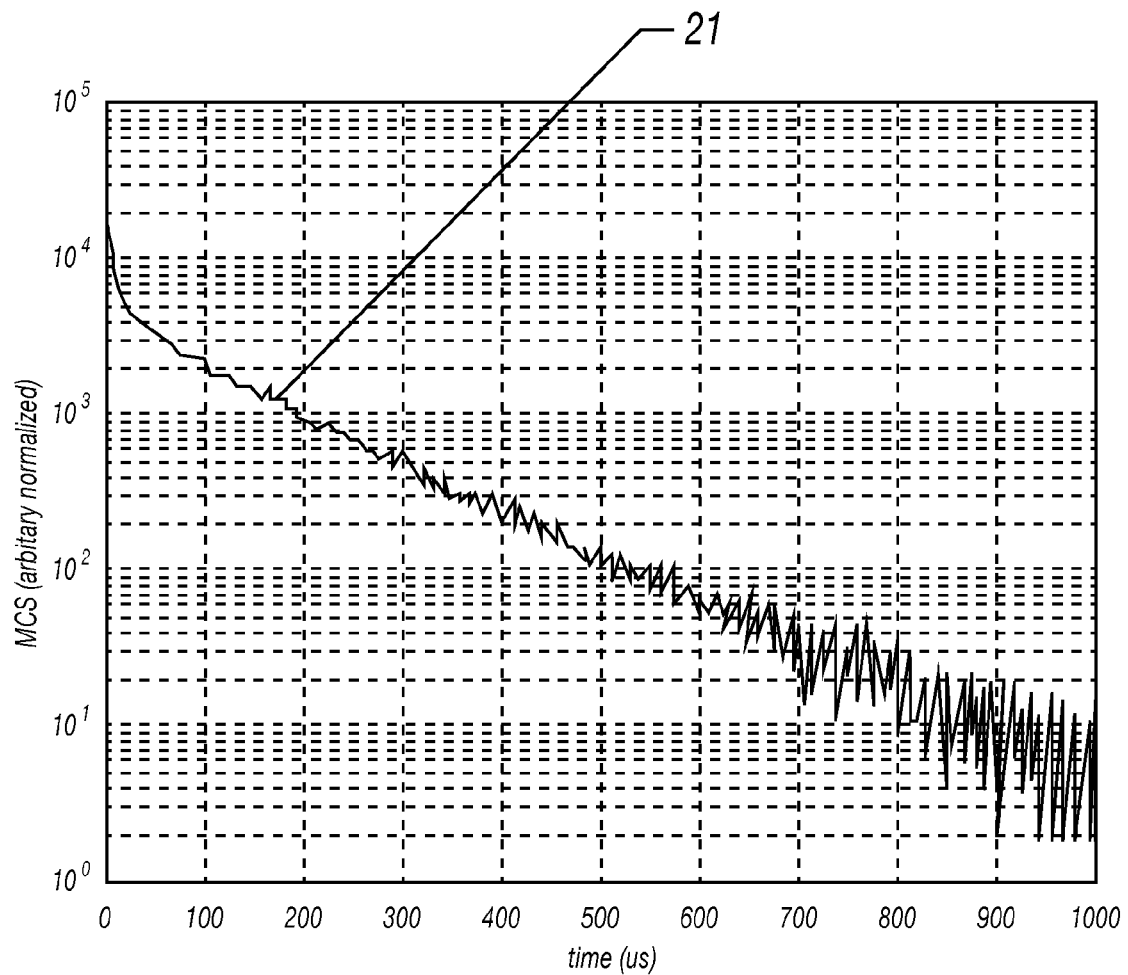
FIG. 2 shows a graph of an example of detector impulse response.

In order to explain the present example method, the impulse response of one of the gamma ray detectors (e.g., 18 and 20 in FIG. 1) may be observed in FIG. 2, which shows a calculated time dependent count rate spectrum (can be measured by a multichannel scaler (MCS) coupled to a photomultiplier/scintillation counter type gamma ray detector) corresponding to a neutron burst (e.g., from the source 14 in FIG. 1) at time=0, which essentially represents the detector impulse response. At time=0, one may observe a "spike", which corresponds to gamma rays generated predominantly by fast neutron inelastic scattering and to a much lesser extent by epithermal/thermal neutron capture events. After time=0, when the source is inactive, the number of detected gamma rays decays close to exponentially.

A detector thermal ratio (TRat) may be defined as the ratio of the sums of the time spectra in two detectors within selected time gates or time windows with respect to the neutron burst. TRat may be a function of the time gates (see, e.g., U.S. Patent Application Publication No. 2011/0213555, incorporated herein by reference in its entirely). Because the time spectra decay substantially exponentially, the starting time of the time gate has a greater effect than the end of the time gate on the TRat response. In order to evaluate the TRat response as a function of the starting time of the timing gate, Monte Carlo simulation may be used to model several impulse responses and to compute TRat by varying the starting time of the timing gate and fixing the end time of the timing gate at infinity. The conditions for the simulations used in the present example include 20 porosity unit (p.u.) sandstone filled with 200-ppk (parts per thousand) salt water disposed in the pore spaces thereof. A wellbore drilled through the formation may be 8 inches in diameter and has inserted and cemented therein a 5.5-inch outside diameter (O.D.) steel casing (having 4.95-inch internal diameter—ID) and wherein the cement disposed between the wellbore wall and the exterior of the casing is American Petroleum Institute (API) class H cement. The wellbore is considered to be filled with three different borehole fluids separately, fresh water, 100-ppk brine, and 200-ppk brine (sodium chloride solution in water).

Figure 3:
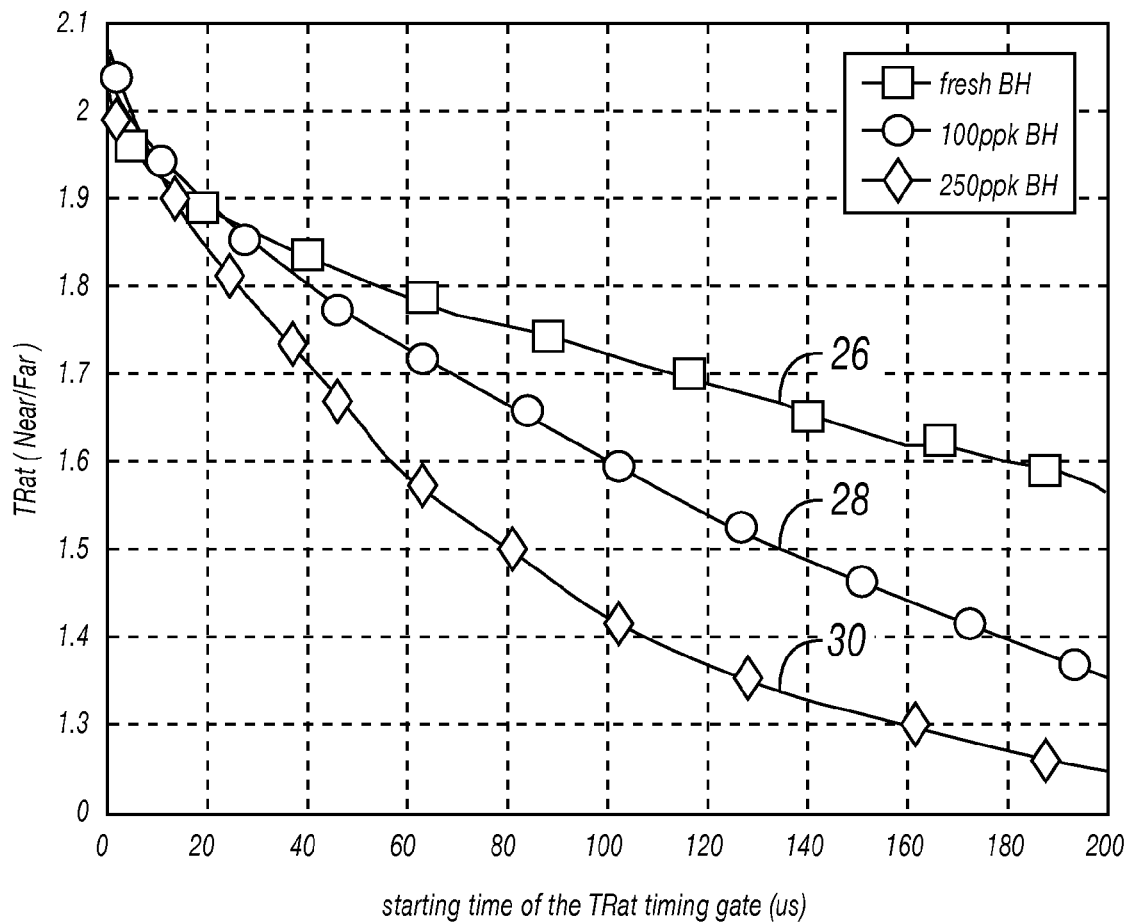
FIG. 3 shows a graph of detector thermal ratio (TRat) as a function of the starting time of the time gate.

The three curves, 26, 28, 30, respectively, in FIG. 3 show modeled TRat response with respect to gate starting time for the above described wellbore conditions and corresponding to the foregoing three different borehole fluids. The differences between the three curves 26, 28, are only due to the different borehole salinity, because all the other conditions are exactly the same. The borehole salinity effect in TRat is very small when the timing gate starts earlier than 20 μs after the neutron burst, and will increase as the timing gate starts later after the neutron burst.

Figure 4A:
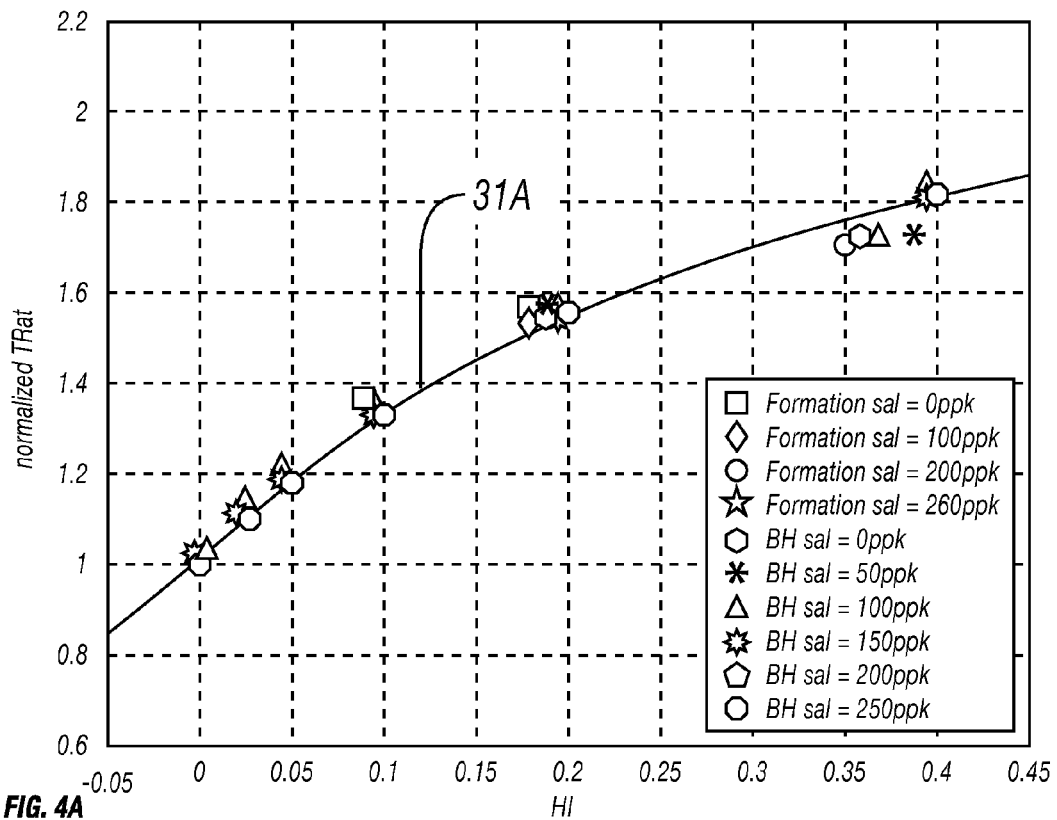
FIGS. 4A and 4B show graphs of TRat as a function of formation hydrogen index (HI) for different gate starting times after a neutron "burst."
Figure 4B:
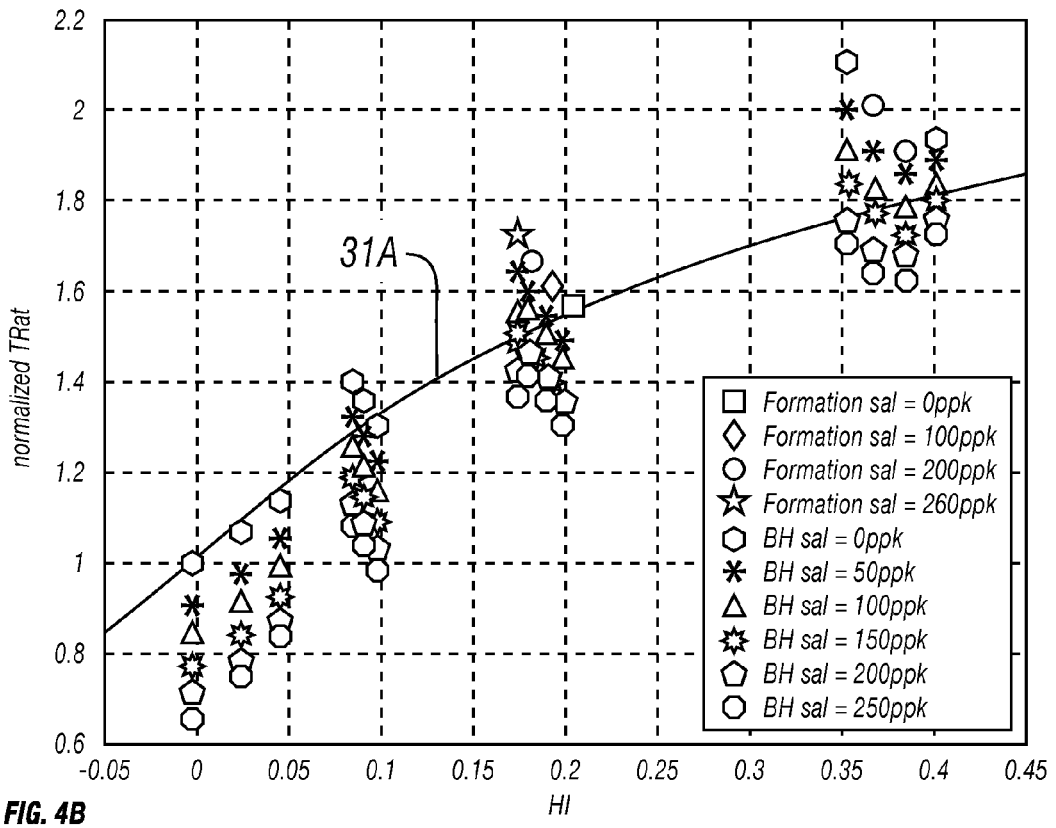

This phenomenon does not only appear to exist for one formation condition, it appears to exist for many known formation conditions. FIGS. 4A and 4B show, respectively, TRat calculations with timing gates starting at 10 or 130 μs after the neutron burst for a large number of formation and borehole conditions. The calculations are for sandstone formation with porosities of 0, 2.5, 5, 10, 20, and 40 p.u., respectively. The symbols indicate different formation connate water salinities, and the different colors indicate different wellbore fluid salinities. The solid lines are $3^{rd}$ order polynomial fits through the fresh water data in both the formation and the wellbore.

The TRat with timing gate starting at 10 μs after the burst (called the "early TRat), shown in FIG. 4A) has almost no wellbore salinity effect in all modeled formation conditions, and the TRat with timing gate starting at 130 μs after the burst (called the "late TRat", shown in FIG. 4B) has a large wellbore fluid salinity effect. The total salinity effect in the late TRat depends on the formation porosity and salinity and it is very difficult to correct for wellbore salinity. This is because the wellbore salinity may not be well known, the correction is large relative to the measurement of TRat and is non-linear. Thus, in the present example, the wellbore salinity effect may be accounted for by using the early TRat. In addition, the early TRat may be expected to have better statistical precision than the late TRat.

The reasons for this phenomenon are quite complex. They involve the complex process of fast neutrons slowing down and being captured as a function of time in the existing instrument and wellbore geometry. There is not believed to be a theoretical analytical solution and obtaining an approximate solution may be challenging. One possible explanation may be as follows.

Consider the whole process of emission of high energy neutrons and the subsequent detection of gamma rays as consisting of two processes. First, fast neutrons from the source slow down to an energy just above the thermal energy, at which point the wellbore salinity does not yet have a significant impact on the detected gamma rays. At this point, the neutron population in the formation and wellbore does not depend significantly on the wellbore salinity. Second, the foregoing slowed neutrons keep losing energy by scattering and eventually become thermal neutrons, which can then be captured by certain nuclei and produce capture gamma rays. In the second process, higher borehole salinity and thus higher chlorine content increase the neutron capture probability and the concomitant capture gamma ray production. Right after the neutron source burst or at a very early time after the burst, the fast neutrons have just been slowed down to epithermal or thermal energies and the borehole salinity does not yet have a significant impact on the neutron flux distribution. If the gamma ray counts from this time to infinity are integrated, the integrated number of gamma ray counts should be proportional to the total neutron population in the "sensitive volume" (the volume in which, if a neutron is captured, the resulting gamma ray can register in the detector) because all neutrons will eventually be captured at some time. This is based on the assumption that there are no neutrons moving into or out of the "sensitive volume".

In reality, thermal neutrons diffuse. The diffusion takes the form of thermal neutrons moving from regions of high neutron density to regions of lower neutron density. High borehole salinity will strongly capture thermal neutrons and reduce the local neutron density. Different borehole salinities will cause changes in neutron diffusion into and out of the "sensitive volume" and thereby change the total gamma ray counts at the individual detectors. However, the diffusion difference caused by borehole salinity may be independent of the detector spacing. Therefore, after determining the count rate ratio using an early timing gate, the borehole salinity effect can be canceled.

The explanation above is substantially simplified. In reality, there is not a clear demarcation between the first and second processes in terms of both time and energy. The borehole salinity effect cannot be canceled perfectly. However, it can be reduced to below 1 p.u., as shown in FIG. 4A, which may be acceptably small for formation evaluation applications.

Figure 3A:
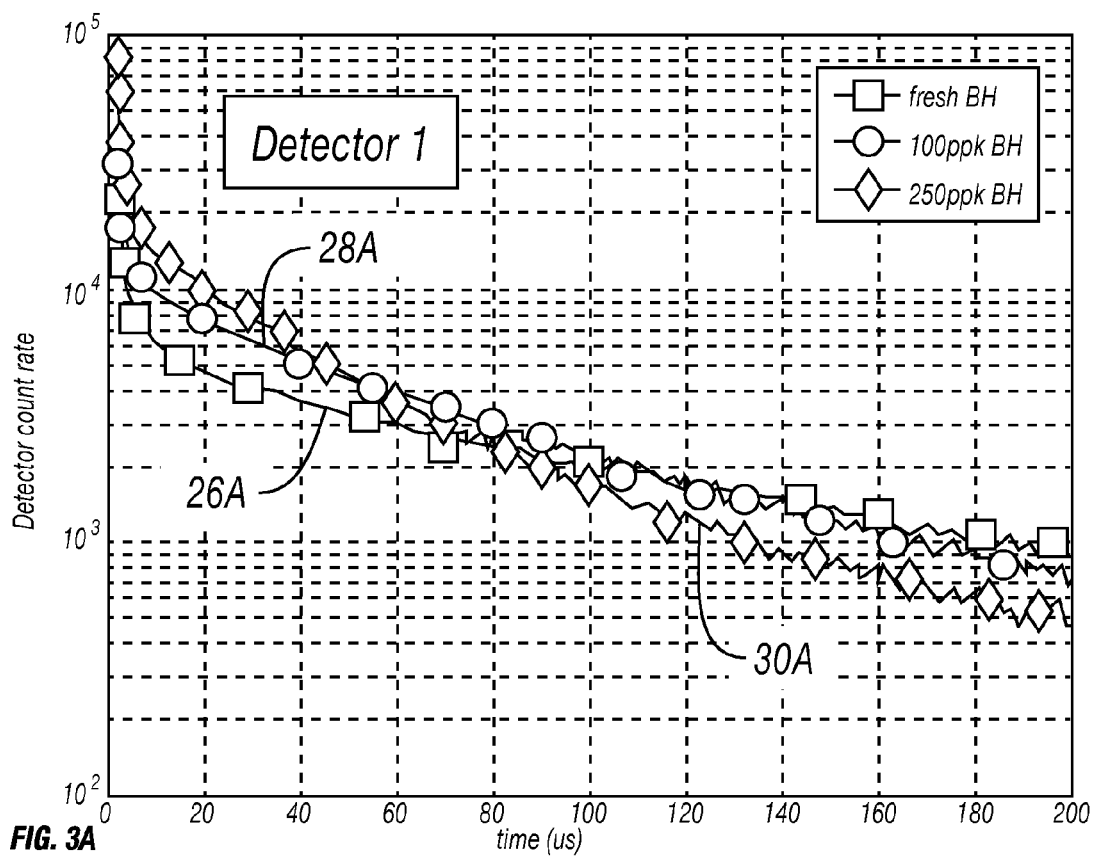
FIGS. 3A and 3B show, respectively, the calculated time dependent spectra of the two detectors of FIG. 1 at different spacings, in conditions essentially the same as the ones used to generate the curves shown in FIG. 3.
Figure 3B:
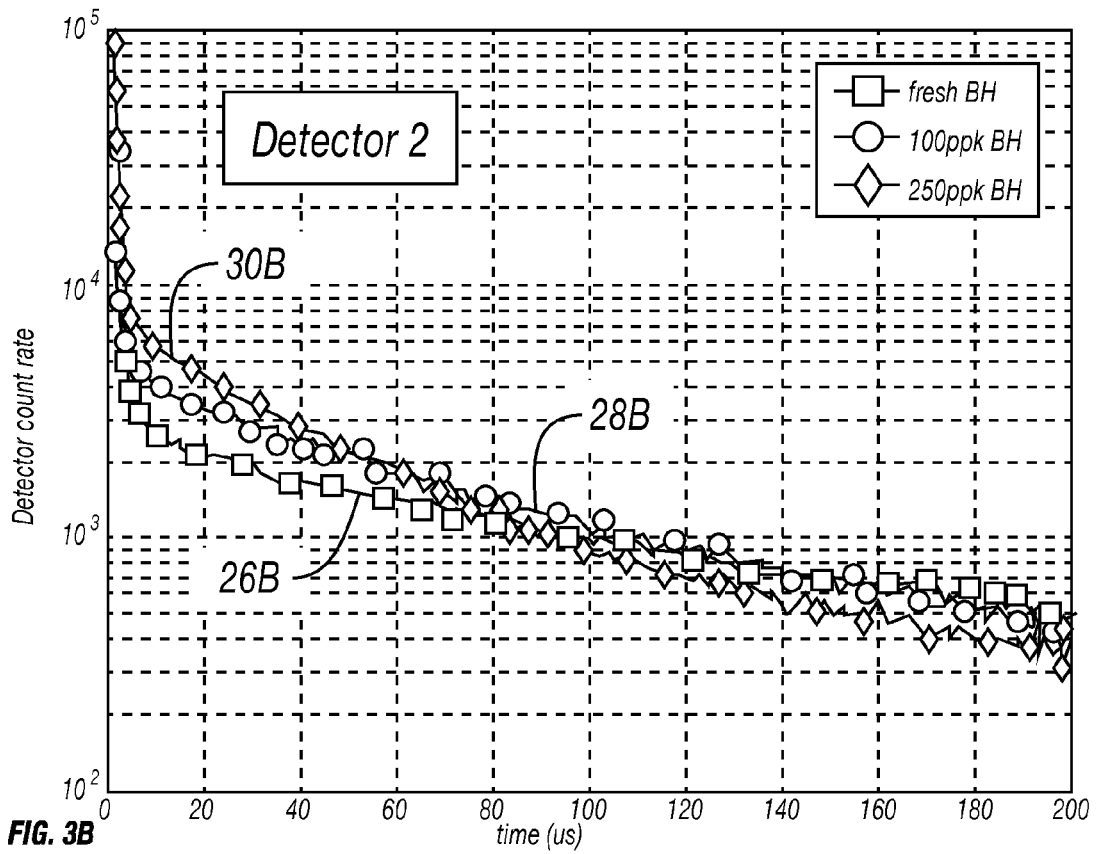

In order to explain how to achieve a detector count ratio (TRat) substantially free of wellbore salinity with various neutron burst schemes other than the impulse scheme, the following description will focus on the impulse response further to identify the basic components which are required to compensate the wellbore salinity. FIGS. 3A and 3B show, respectively, the calculated time dependent spectra of the two detectors (18, 20 in FIG. 1) at different spacings, in conditions essentially the same as the ones used to generate the curves shown in FIG. 3. Apparently, the wellbore salinity effect in the detector count rate time spectra reverses sign before and after around 70 μs after time=0, when the neutrons are generated, for both detectors. An "early gamma ray count" may be defined as a detected gamma ray event in the detector at the time t, caused by the capture of a neutron generated at $t_0$, where $(t-t_0)<70$ μs. For "late gamma ray count" the time different $(t-t_0)$ is greater than 70 μs. An "early time gate" may be defined as a time gate which contains at least some early gamma ray counts. An "early time gate" may also contain some late gamma ray counts due to contamination, which is hard to avoid in reality. A "late time gate" may be defined as a time gate which contains late gamma ray counts but no early gamma ray counts. Higher wellbore salinity will cause the detected early gamma ray counts to be higher, and cause the detected late gamma ray counts to become lower. The detector count rates may be summed in one or more "early time gates" and summed in one or more "late time gates." The detector count rates may be summed in a plurality of early or late time gates with different weights applied to the respective early and late time gates. The foregoing summing may be performed for both detectors and a ratio may be calculated to calculate TRat. By fine tuning the early and late time gates, and the relative weights associated with them, it may be possible to compensate the wellbore salinity effect and determine a TRat substantially free of wellbore salinity effect. The time gate, which is used in FIG. 4A, which extends from 10 μs after the neutron burst to infinity, shows a simple example. the example of FIG. 4A shows results of having an early time gate that extends from 10 μs after time=0 to 70 μs after time=0, and contains only early gamma ray counts, and a late time gate, which extends from 70 μs after time=0 to infinity, and contains only late gamma ray counts, with the same weights for both early and late time gates. Using the same procedure it may be possible to compensate the wellbore salinity effect of the sum of individual detector count rates in selected time gates with proper weights, without taking a detector ratio.

A practical consideration is the gamma ray counting statistics. To achieve reasonable statistical precision, as many neutrons as the neutron source can produce are imparted into the wellbore and the surrounding formations. However, the neutron output is practically limited when the source is "on" or the burst time is relatively short and the wait time between bursts is relatively long. Neutron generation efficiency is related to the duty factor (burst duration/total time) with better neutron generation efficiency corresponding to greater duty factors. In order to impart more neutrons, it may be insufficient only to turn on the neutron production for a typical duration, e.g., 1 μs and wait for a relatively long time until the subsequent burst. A long duration neutron burst may be more favorable for high statistical precision. For example, some pulsed neutron generators known in the art can provide 20 μs, 60 μs, or even a few hundred microsecond bursts in order to enhance the statistical precision of the measurements made. In such case, the time gate from the end of the neutron burst to 70 μs after the end of the neutron burst does not only contain early gamma ray counts, but also contains some late gamma ray counts. This is because some of the gamma ray counts at 70 μs after the end of the neutron burst are induced by neutrons that were generated during the early part of the neutron burst. Thus, the difference between the time the gamma ray registered in the detector and the time the neutron is generated may be more than 70 μs. These are not early gamma ray counts but the late gamma ray counts. Thus, some of the early time gate may be contaminated by late gamma ray counts. The longer the neutron burst, the more late gamma ray contamination there is in this time gate. Additionally, some of the early gamma ray counts can be obscured by the neutron burst itself. During neutron burst "on" time, fast neutrons exist in the system and can induce gamma rays by inelastic scattering. Inelastic gamma ray counts registered in the detector cannot be separated in time from some of the early gamma ray counts corresponding to source neutrons, which are generated earlier in the same neutron burst. On the other hand, the time gate 70 μs after the end of the neutron burst only contains late gamma ray counts and is not contaminated by any early gamma ray counts. Another important consideration is the formation neutron capture cross section measurement (Sigma measurement), which can be provided by a long wait time after a neutron burst. Thus, one cannot cut the long wait time too much to improve the duty factor of a short neutron burst to achieve both early timing information and precision. While typical burst lengths are listed above, there is a wide variety of burst lengths from a few microseconds to hundreds of microseconds that may be used in various examples.

Figure 5:
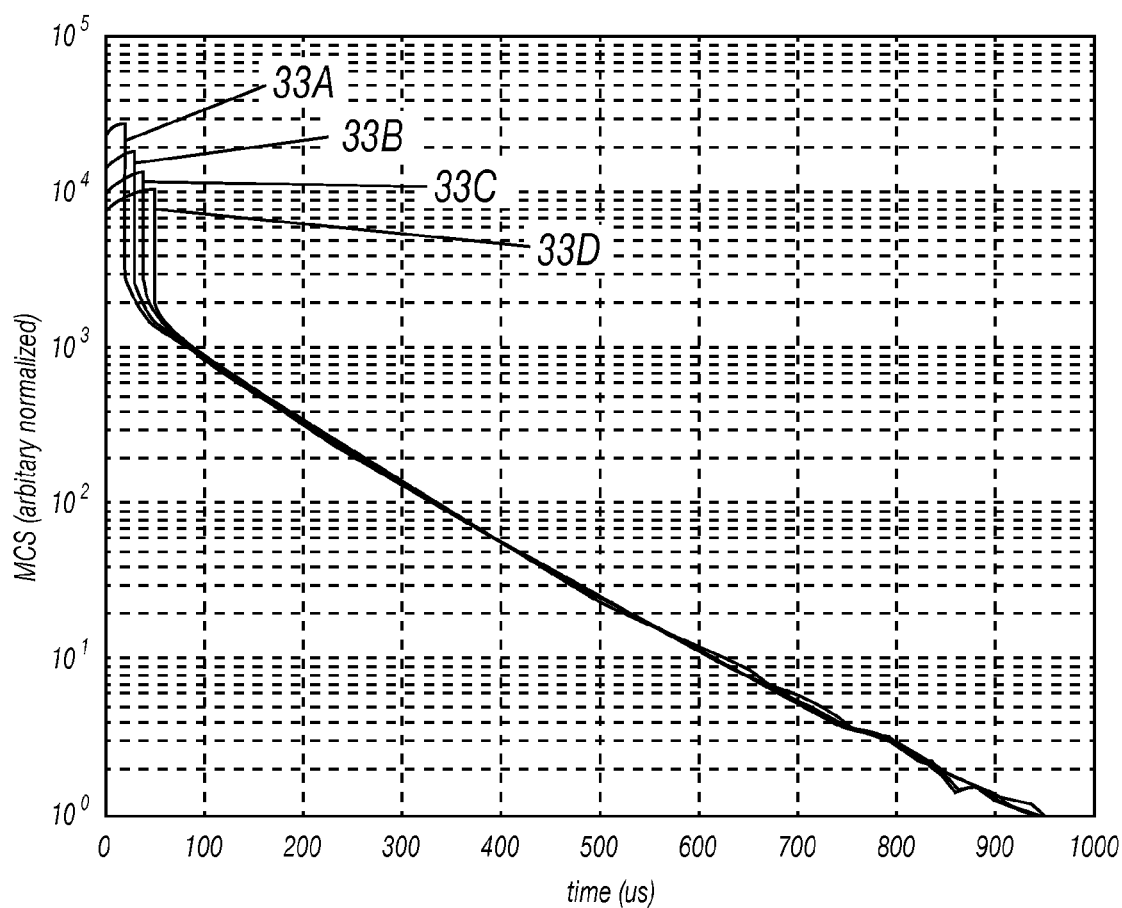
FIG. 5 shows a graph of examples of the neutron burst scheme with different burst length.
Figure 6:
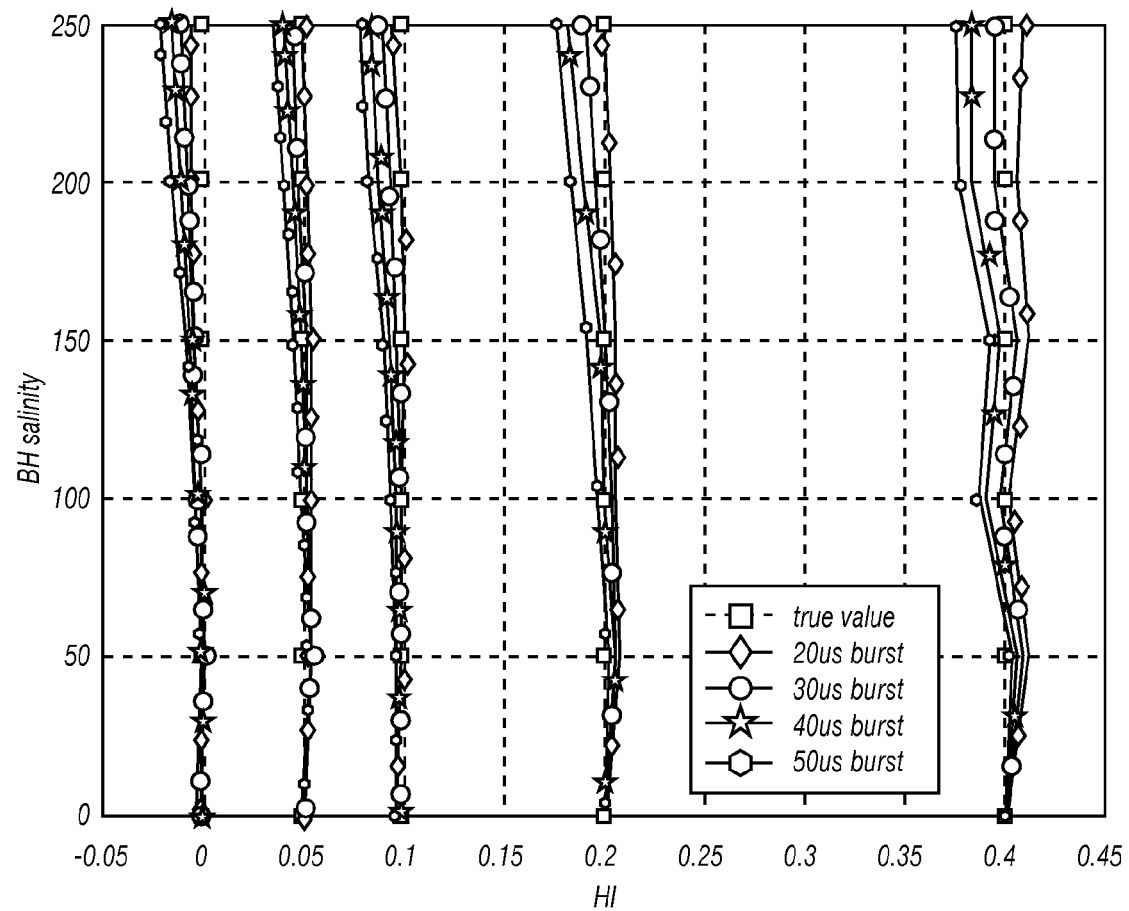
FIG. 6 shows a graph of estimated HI (x-axis) as a function of wellbore fluid salinity (y-axis).

FIG. 5 shows a few examples of neutron burst schemes that may be used in some implementations. The burst lengths are 20, 30, 40, and 50 µs respectively, which are followed by a long wait time. The early TRat is computed for the four burst schemes from the right after the burst to the end of neutron decay (about 1000 µs). This time gate contains both the early and late gamma ray counts. With different burst lengths, the relative numbers of early and late gamma ray counts varies. The estimated HI computed from early TRat are shown in FIG. 6 as a function of wellbore salinity. As may be observed in FIG. 6, the longer the neutron burst is, the more the early gamma ray counts become obscured within the burst gate, and the larger the apparent wellbore salinity effect is. A 50-µs duration neutron burst may introduce a −0.025 HI error out of a total 0.2 HI, with 250-ppk wellbore fluid salinity. On the other hand, a longer neutron burst has better statistical precision due to the higher duty factor (2%, 3%, 4% and 5%, respectively for the 20, 30, 40, and 50-0 burst lengths). The wellbore salinity effect associated with any particular burst scheme with a long neutron burst can be compensated by balancing the weight of the early and late gamma ray counts, which will decrease the statistical precision.

Figure 7:
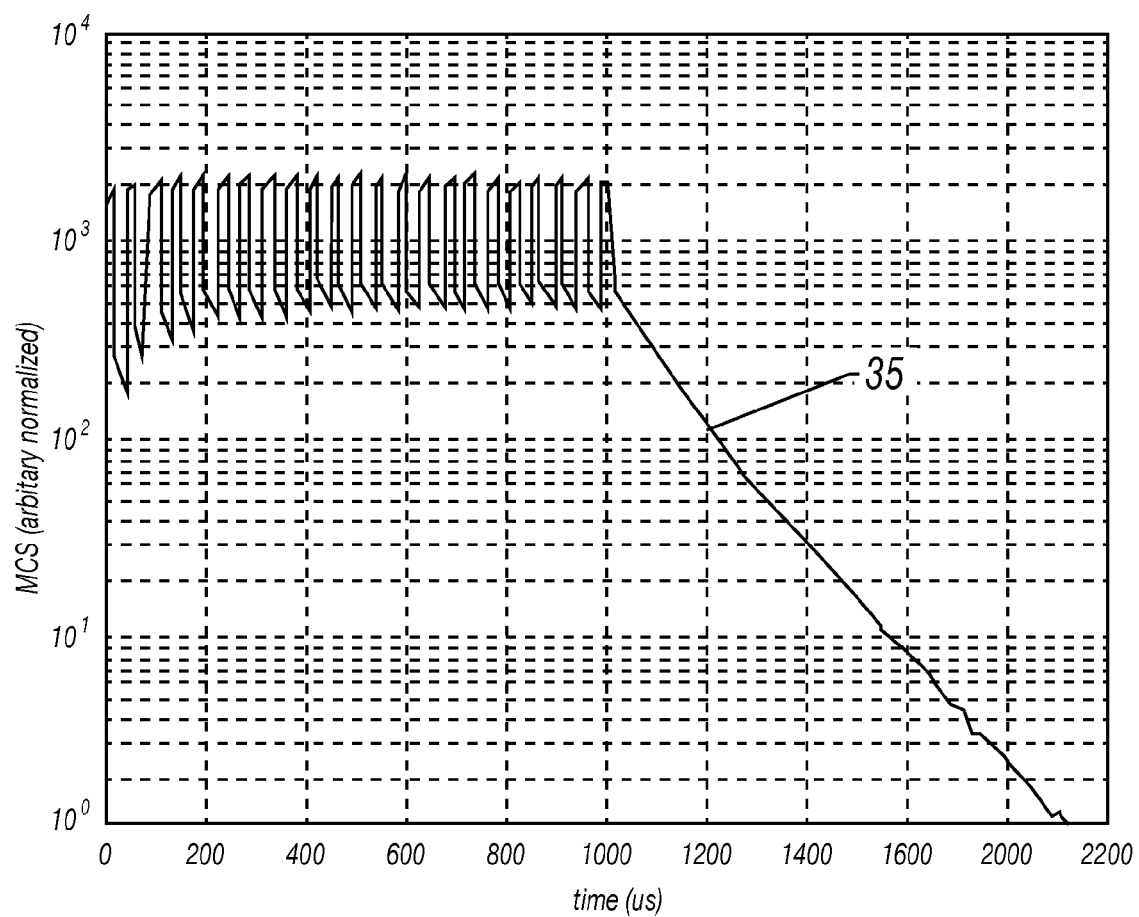
FIG. 7 shows an example neutron burst scheme to achieve good statistics, early gamma ray counts information for neutron-gamma porosity measurement, and long wait time for neutron capture cross section measurement.

In order to have both acceptable early gamma ray count information and good precision, an example neutron burst scheme is shown in shown in FIG. 7. A sequence of a selected number of neutron bursts with a length of, for example, 20 µs, may be separated from each other by a short wait time of, for example, 30 µs to obtain the early gamma ray counts information, and a much longer wait time after the end of the selected number of bursts. In this way, one can irradiate the formation with sufficient neutrons (the burst duty factor may be 20% or even higher), and at the same time the early gamma ray counts information may be obtained with sufficient precision to determine Trat. The long wait time measurement may also available to determine the formation capture cross section.

Figure 8:
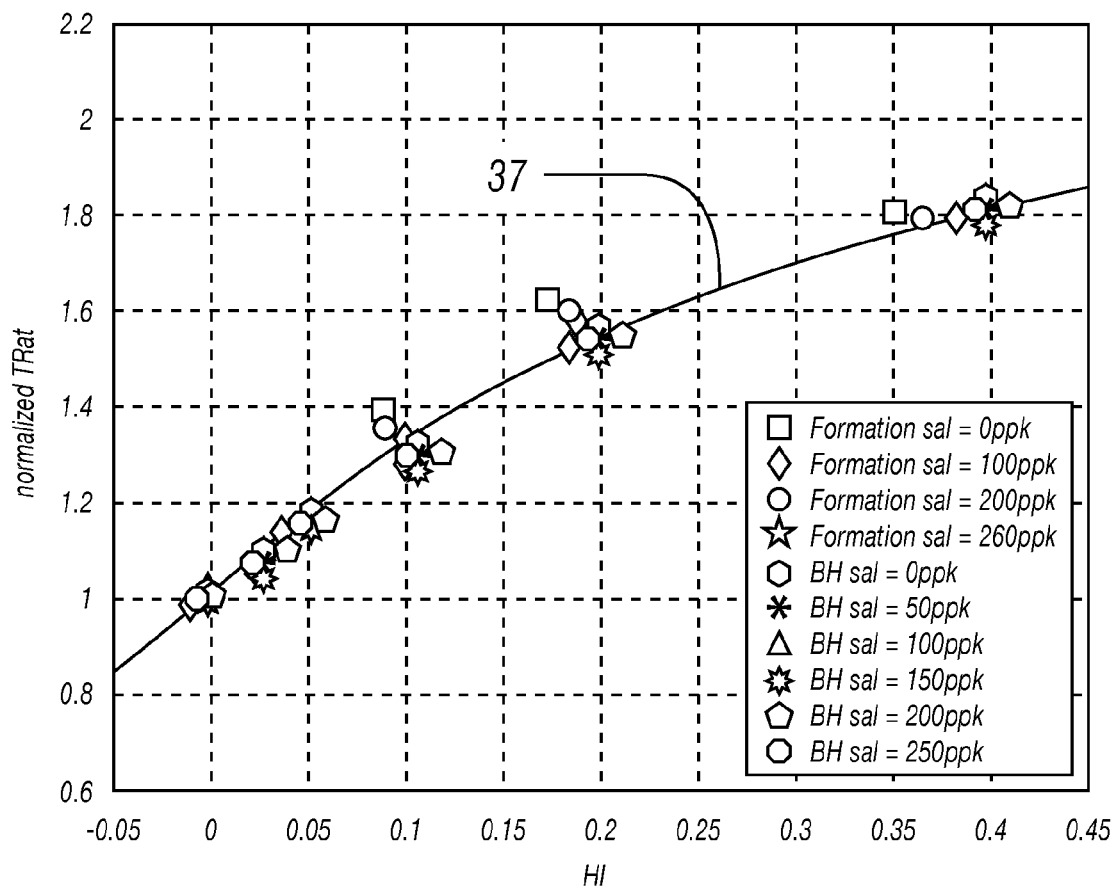
FIG. 8 shows a graph of early TRat based on the neutron burst scheme shown in FIG. 7 as a function of formation HI.
Figure 20:
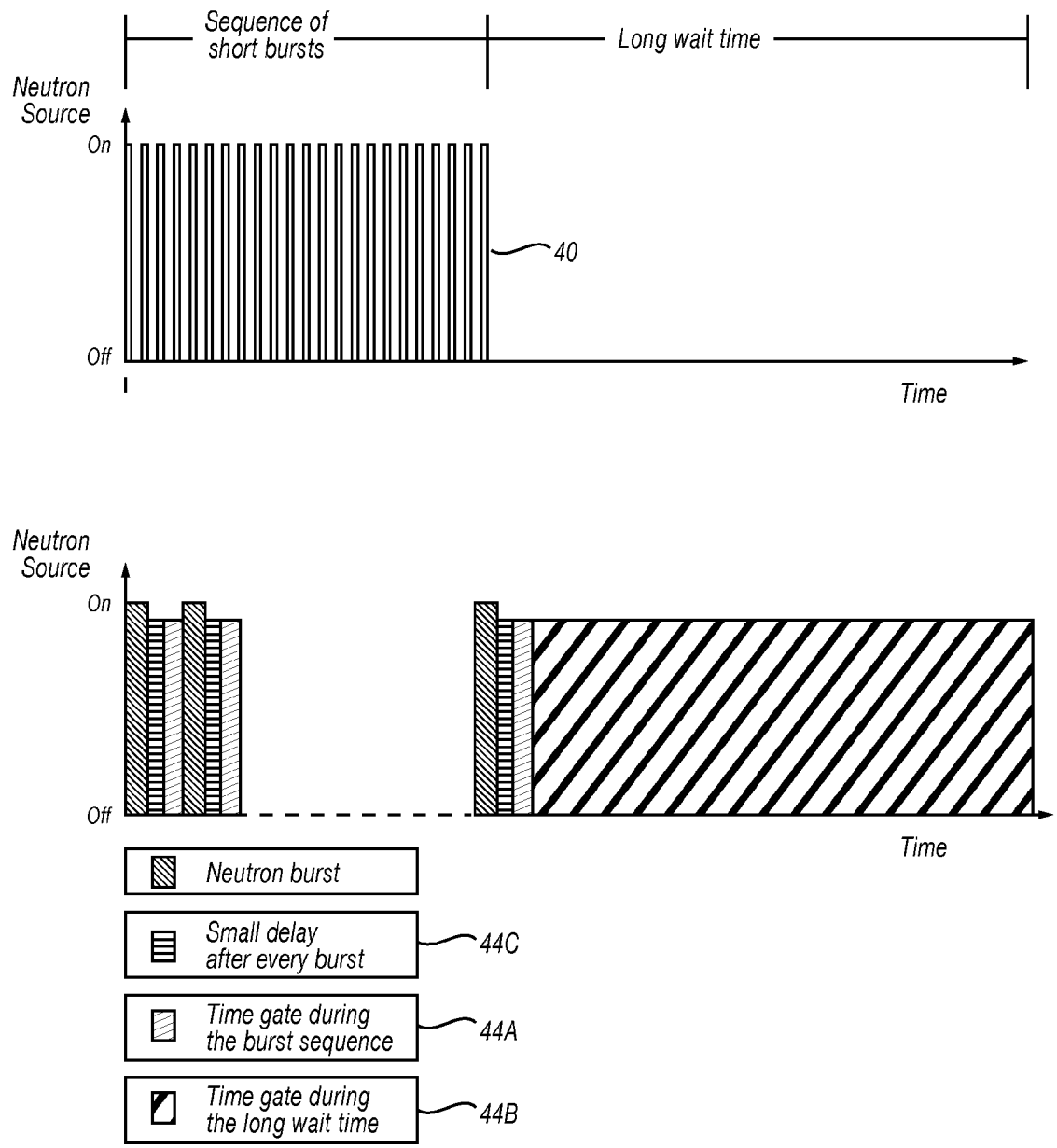
FIG. 20 shows example time gates with reference to the neutron burst timing.

The early TRat may be calculated by summing over the total capture time gate (when the neutron burst is off, except for a small delay after every burst, this time gate is illustrated in FIG. 20) and plotted as shown FIG. 8. The 30-0 short wait time after every neutron burst contains the early gamma ray count information without excessive late gamma ray count contamination. It is possible to adjust the number of short neutron bursts in any example burst scheme to fine tune the amount of early gamma ray counts relative to the late gamma ray counts. The present example may use 23 neutron bursts in total. The apparent wellbore salinity effect is small, and the precision of TRat may be expected to be good because of the selected sequence of neutron bursts. The long wait time measurements for formation capture cross section measurement may also available. The use of a sequence of short pulses separated by short decay intervals is described, for example, in U.S. Pat. No. 6,703,606 issued to Adolph.

FIG. 7 shows just one example of a neutron burst scheme usable with the present example. Following the same principles explained above, those skilled in the art can readily derive other neutron burst schemes with burst lengths longer or shorter than the 20 µs used in the present example, or the short wait time may be longer or shorter than the 30 µs used in the present example. Similar neutron burst schemes have been used for neutron porosity measurements but it is not believed that a burst scheme such as the one described above has been used for neutron-gamma porosity measurement. Neutron-gamma porosity measurements known in the art are believed to be made from TRat measurements only using longer burst lengths. Although certain pulsed neutron instruments use a single short-duration burst to measure wellbore neutron capture decay, the early-time TRat was not known to be used for a porosity measurement. A single short burst can provide the early time gate without too much late gamma ray count contamination, which theoretically can be used to combine with some late time gate to compute a TRat free of wellbore salinity effect. However, such a TRat may have an unacceptably poor statistical precision due to the low number of gamma ray counts in the single short burst decay period.

As described above, some of the early gamma ray counts can be mixed with inelastic gamma ray counts inside the duration of a neutron burst. In reality, a neutron burst cannot be ended instantaneously. It is possible that after the end of a neutron burst, there may be still some inelastic gamma rays being generated and detected. If a time gate after a neutron burst is extended early enough or even into the neutron burst, some inelastic gamma ray counts may contaminate the gamma rays detected during such time gate. The fast neutron flux, which induces the inelastic gamma rays, depends on not only the hydrogen nuclear density but also the presence of atomic nuclei which can scatter neutrons inelastically. As long as the inelastic gamma ray contamination is small, for example, than 5% to 10% of the total gamma ray counts in all the time gates, which are used to compute TRat, one can still have a TRat substantially free of wellbore salinity effect and provide a good formation hydrogen index measurement.

The above examples show that it may be possible to optimize the neutron burst timing scheme and the time gates to substantially reduce the wellbore salinity effect.

However, wellbore salinity is only one of a plurality of wellbore conditions that may be accounted for in neutron-gamma porosity measurement. Since the physics involved in neutron-gamma porosity measurement are quite complex, the wellbore contaminations of TRat may also depend on many formation conditions, for example, porosity, formation fluid type, formation lithology (formation mineral composition), connate salinity, as non-limiting examples. In order to account for substantially all the wellbore effects, it is desirable to separate the wellbore and formation responses. In this way, the wellbore and formation effects on the detected gamma rays can be treated separately for the determined porosity, and the wellbore and formation environmental corrections may be independent of each other. This may be possible based on a TRat$_0$ linear approximation, which will be introduced below.

Figure 9:
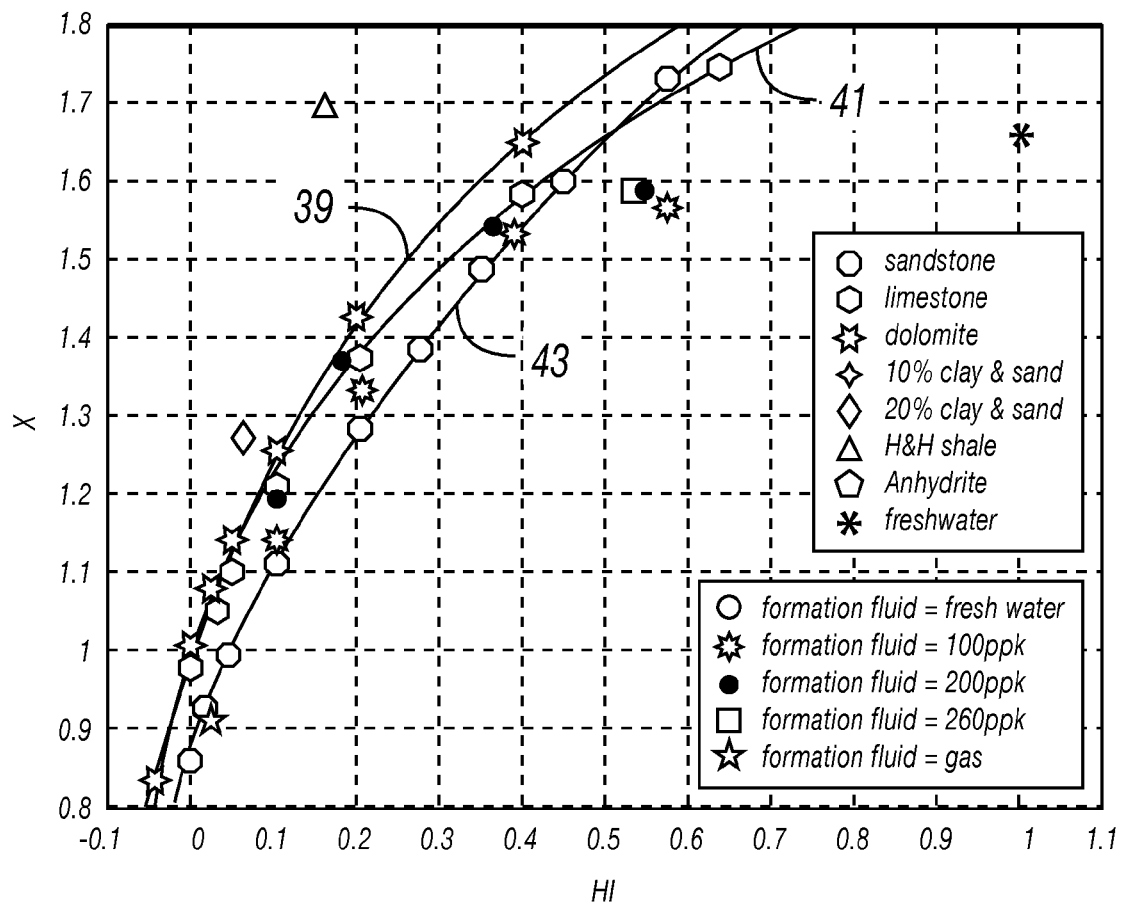
FIG. 9 shows a graph of TRat as a function of formation HI for wellbore conditions 8 inch diameter wellbore, 5.5-inch diameter casing cemented therein, 4.95-inch internal casing diameter, API class H cement between the wellbore and the casing exterior, and fresh water in the wellbore.

FIG. 9 shows the TRat response at one set of wellbore conditions (8 wellbore diameter, 5.5 inch casing OD, 4.95 inch casing ID, class H cement, casing centered in the wellbore) for 36 different formation conditions (see the figure captions for details). TRat at the foregoing wellbore conditions may be defined as TRat0. The foregoing may be forward modeled as to what a neutron-gamma instrument would measure directly, and such forward modeling results can be obtained using a Monte Carlo code. TRat$_0$ is thus a formation property and is independent of wellbore conditions. TRat$_0$ is related to the formation neutron-gamma cross sections. The TRat0 linear approximation is that the TRat (tool measurement) at any wellbore condition is a linear function of TRat$_0$, as shown in Equation 1

$$\text{TRat}=f_1(BH)\cdot\text{TRat}_0+f_2(BH) \quad (1)$$

Where, the gain ($f_1$) and offset ($f_2$) are functions of wellbore conditions, and are independent of formation conditions. Thus, the wellbore (gain and offset) and formation responses (TRat$_0$) may be separable and may be processed separately. This may dramatically simplify the interpretation. The detector ratio TRat is a non-linear function of formation hydrogen index (or porosity). By separating the formation and wellbore response, one can perform borehole corrections before converting the TRat to HI (or porosity) to avoid a non-linear transformation.

Figure 10:
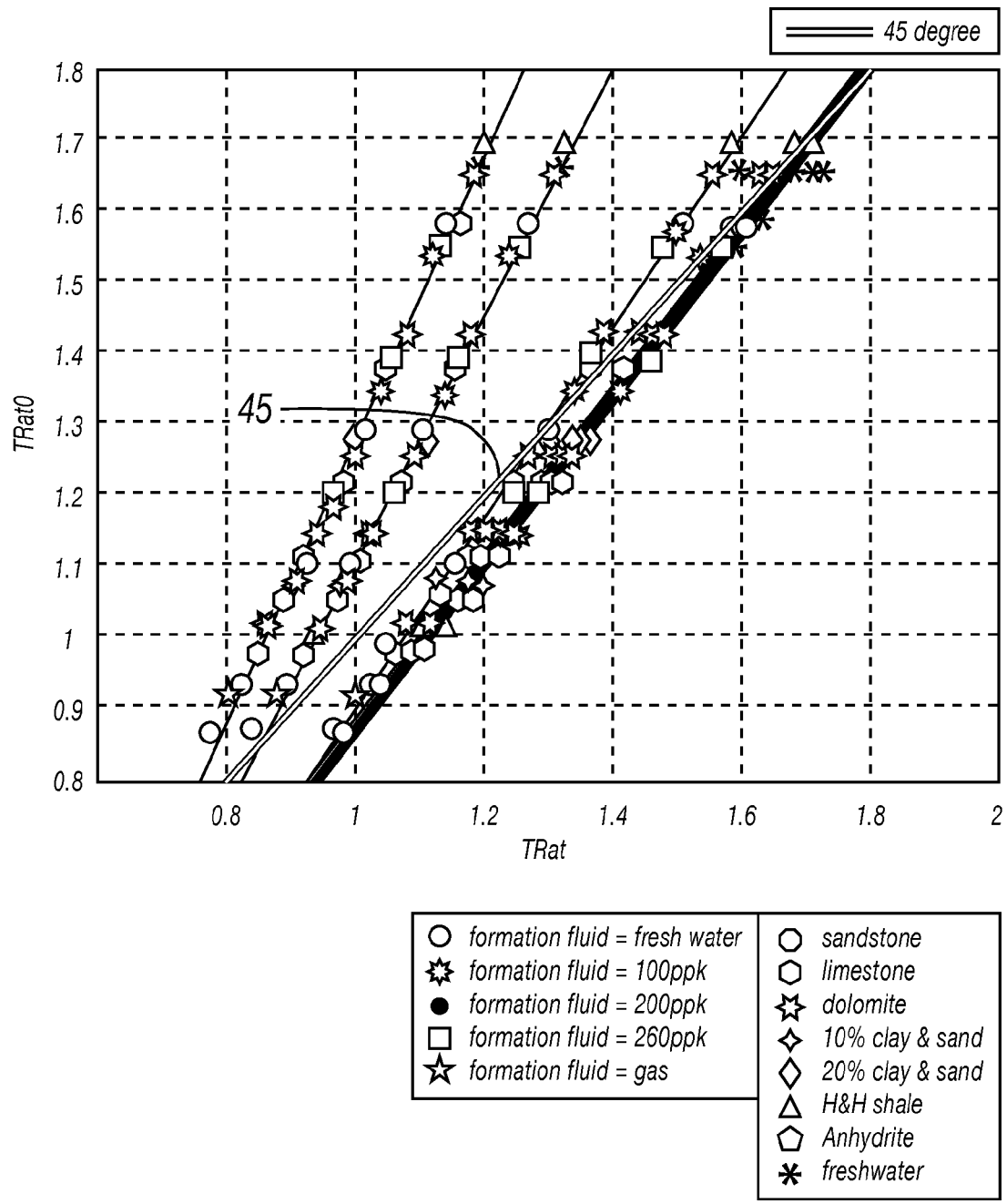
FIG. 10 shows a graph of $TRat_0$ vs. TRat in a 10-inch diameter wellbore with 5.5 inch casing, 4.95-inch casing ID, class H cement, and centralized casing. The wellbore is filled with 10 different fluids: fresh water, salt water (at NaCl concentrations of 50, 100, 150, 200, 250 ppk respectively), methane gas (0.15 and 0.25 $g/cm^3$), diesel fuel and light oil (0.65 $g/cm^3$). The ten solid lines are linear fits for the foregoing ten different borehole fluids. The dashed line is a 45-degree diagonal line, where TRat is equal to $TRat_0$.

In order to verify how good the $TRat_0$ linear approximation is, more than 5000 Monte Carlo simulations were generated for 36 different formation conditions in various wellbore conditions. FIG. 10 shows how well this approximation works for a 10 inch diameter wellbore with the same casing and cement type but filled with 10 different wellbore fluids. There are 10 black solid lines in the left panel of FIG. 10, which are the linear fits for 10 borehole fluids. TRat data well fit a linear function of $TRat_0$ in the 10 borehole conditions. Since the wellbore salinity effect has been substantially eliminated in TRat, there are 6 lines all together for different wellbore fluid salinities from fresh to 250 ppk, which cannot easily be distinguished from each other visually. The line for diesel fuel is also very close to the 6 water lines. A line for light oil is further to the left. The lines for two gas-filled wellbores are well separated at the left from the corresponding lines for liquid-filled wellbores. All the 10 different borehole conditions only change the gain and offset, but not $TRat_0$.

Figure 11:
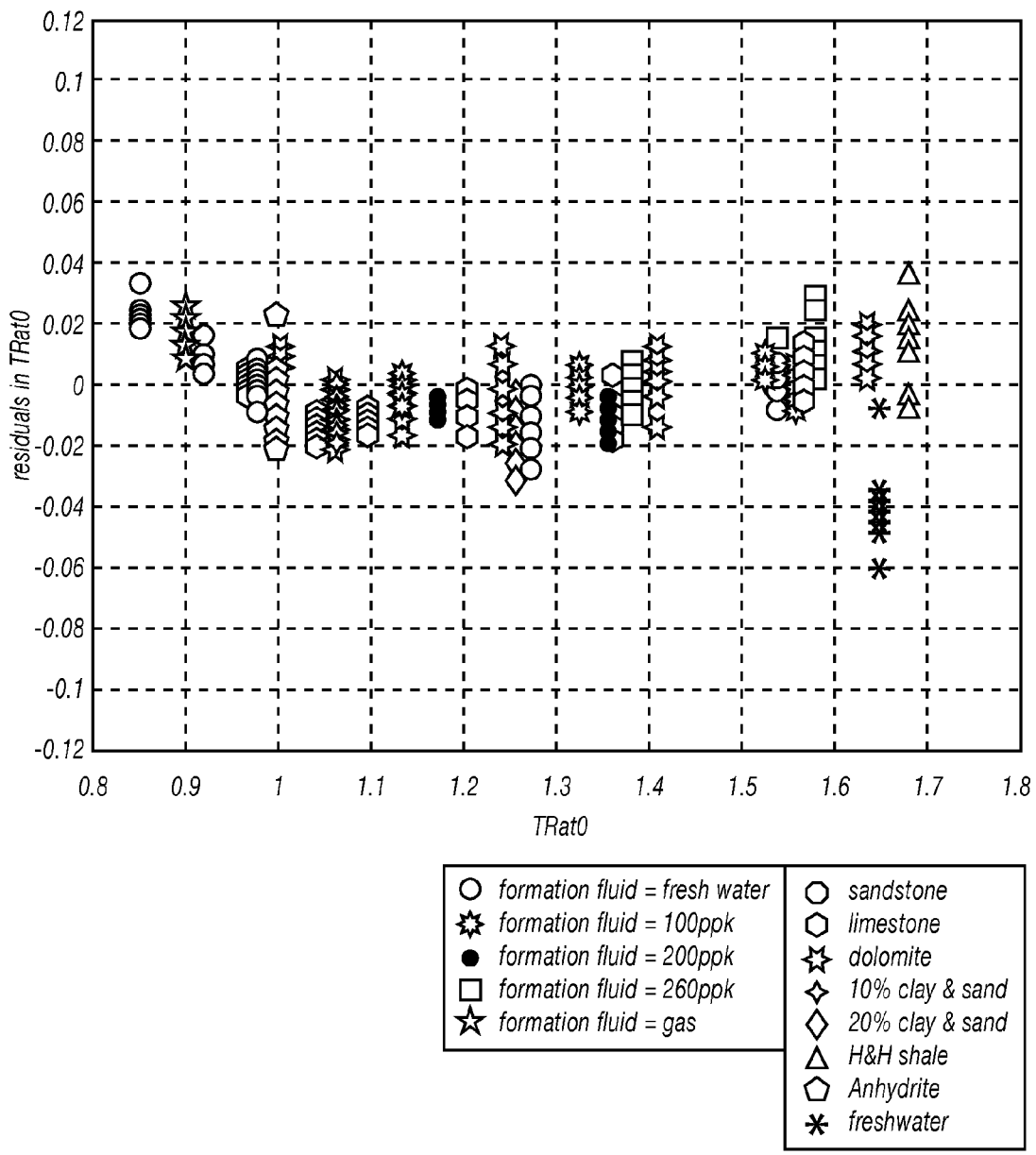
FIG. 11 shows a graph of the difference between the $TRat_0$ and estimated $TRat_0$ based on linear fits as a function of $TRat_0$.

FIG. 11 shows residuals in the estimated $TRat_0$ based on linear fitting as a function of $TRat_0$. Equation 2 shows how to convert the TRat at any wellbore condition to an estimated $TRat_0$, which is an inverse model. The gain and offset (a and b) are functions of wellbore conditions. Equation 1 is a forward model. The residuals are small except for 0 p.u. sandstone and 100 p.u. (fresh) water. A trend in the residuals as a function of $TRat_0$ does not seem to be observable, which indicates that there is no need for a higher order term. Overall, the linear approximation may be acceptable for 10-inch wellbore diameter. The residuals may be converted to porosity units and verified at all simulated wellbore conditions as follows.

$$\overline{TRat_0} = a(BH) \cdot TRat + b(BH) \quad (2)$$

TABLE 1

| 14 wellbore diameter and casing diameter combinations. (Units: inch) | | | | | | | | | | | | | |
|---|---|---|---|---|---|---|---|---|---|---|---|---|---|
| BSIZ | 6 | 6 | 6 | 8 | 8 | 8 | 8 | 8 | 10 | 10 | 10 | 10 | 12.25 | 12.25 |
| CSIZ | 5.5 | 5.5 | 4.5 | 5.5 | 7 | 7 | 7 | 7 | 5.5 | 5.75 | 6 | 6.25 | 5.5 | 9.625 |
| CID | 4.95 | 4.67 | 4 | 4.95 | 6.538 | 6.366 | 6.094 | 5.92 | 4.95 | 4.95 | 4.95 | 4.95 | 4.95 | 8.535 |

Figure 12A:
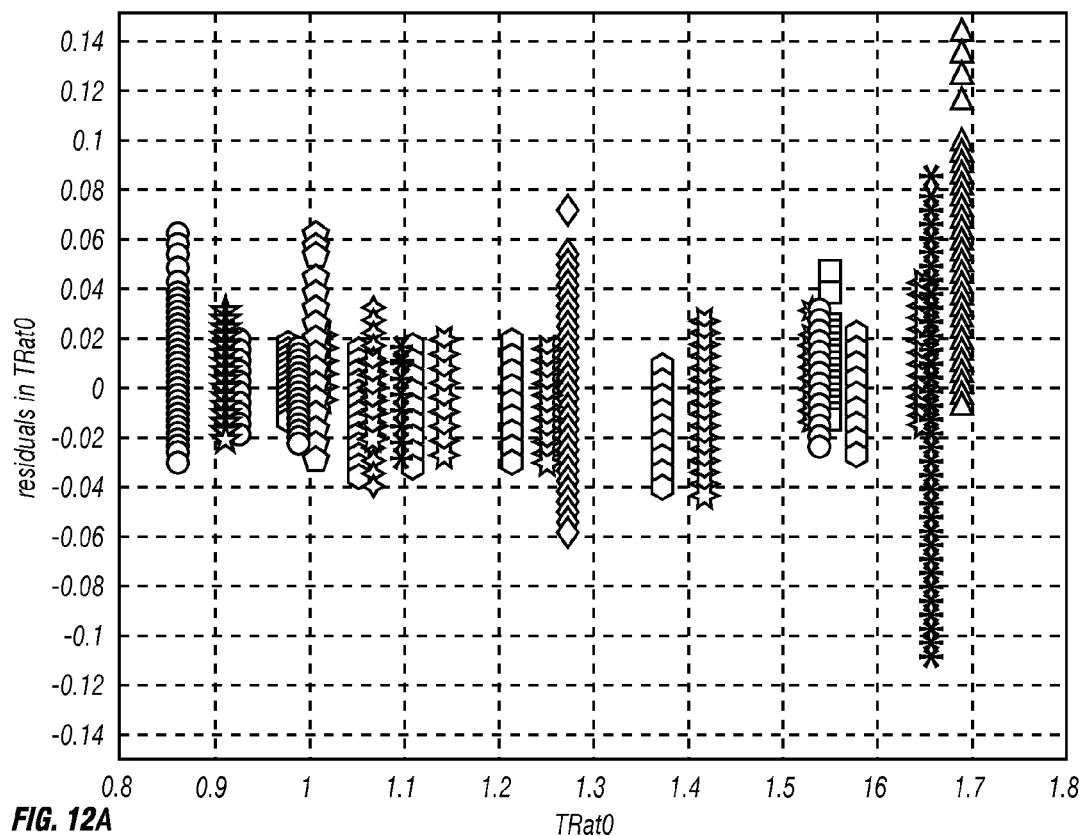
FIG. 12A shows a graph for verifying the $TRat_0$ linear approximation in fourteen different wellbore and casing sizes (see Table 1 for details). Each wellbore can be filled with ten different borehole fluids. The total number of simulations is 36×14×10=5040. The graph shows the residuals in $TRat_0$ as a function of $TRat_0$.

BSIZ represents wellbore diameter, CSIZ represents casing OD and CID represents casing ID in Table 1. Monte Carlo modeling may be used to simulate the instrument response of the 36 formation conditions in 14 different borehole size/casing size combinations, which are shown in Table 1 above. For each set of borehole size/casing size conditions simulations were performed for 10 different wellbore fluids. The total number of simulations performed was 36×14×10=5040. The foregoing modeling database covers a very wide range of realistic formation and wellbore environmental conditions. FIG. 12A shows how well the $TRat_0$ linear approximation appears in the database of all the foregoing 5040 simulations in terms of limestone-equivalent HI. The foregoing is the difference between the HI converted from $TRat_0$ and estimated $TRat_0$. Thus both $TRat_0$ and the estimated HI may be based on the fit (shown in FIG. 9) of limestone fresh water porosity. As may be observed in FIG. 12A, the accuracy of the $TRat_0$ linear approximation is within +/−2 p.u. for the whole simulation database, with some exceptions. Part of the source of errors may come from Monte Carlo statistical uncertainties. The average errors in the whole database are well below 2 p.u. 100 p.u. fresh water has a very large error, but it is not a condition likely to be encountered when measuring common geologic formations. The H&H shale, which is an average of numerous dry clay core samples, also has a large error, partially due to small HI sensitivity at high porosity. The 20% clay-filled sandstone has a ±4 p.u. error over the whole database. Overall, the $TRat_0$ linear approximation appears to be accurate in many ordinarily encountered wellbore conditions. Thus, the separation of wellbore and formation response appears to be possible.

Given the foregoing, the wellbore effect compensation may be easy to perform. For known wellbore conditions, such as wellbore diameter, casing OD, casing ID, tubing, double casing, cement, and so on, it may be possible to characterize the gain and offset (a and b in Equation 2). In order to do so, one can either perform measurements or simulations or both to study the response. It may not be necessary to use a large number of different formation conditions because the gain and offset are independent of the formation conditions. For unknown wellbore conditions, such as eccentered casing, instrument standoff, wellbore washout, depending on how big those effects are, it may be possible to use the available measurements to determine a correct gain and offset, or provide an accuracy tool planner (forward model) to the experienced user to determine the correct gain and offset case by case.

Figure 12B:
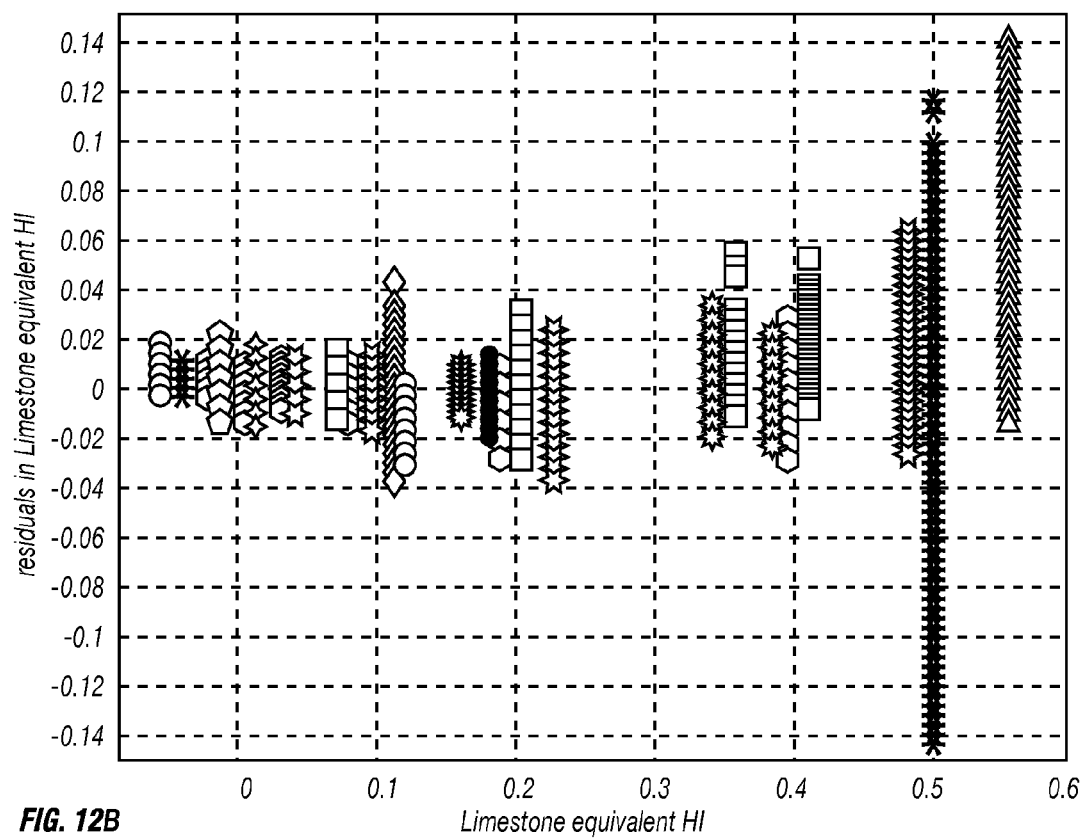
FIG. 12B shows the residuals in FIG. 12A in limestone-equivalent HI as a function of limestone-equivalent HI.
Figure 13A:
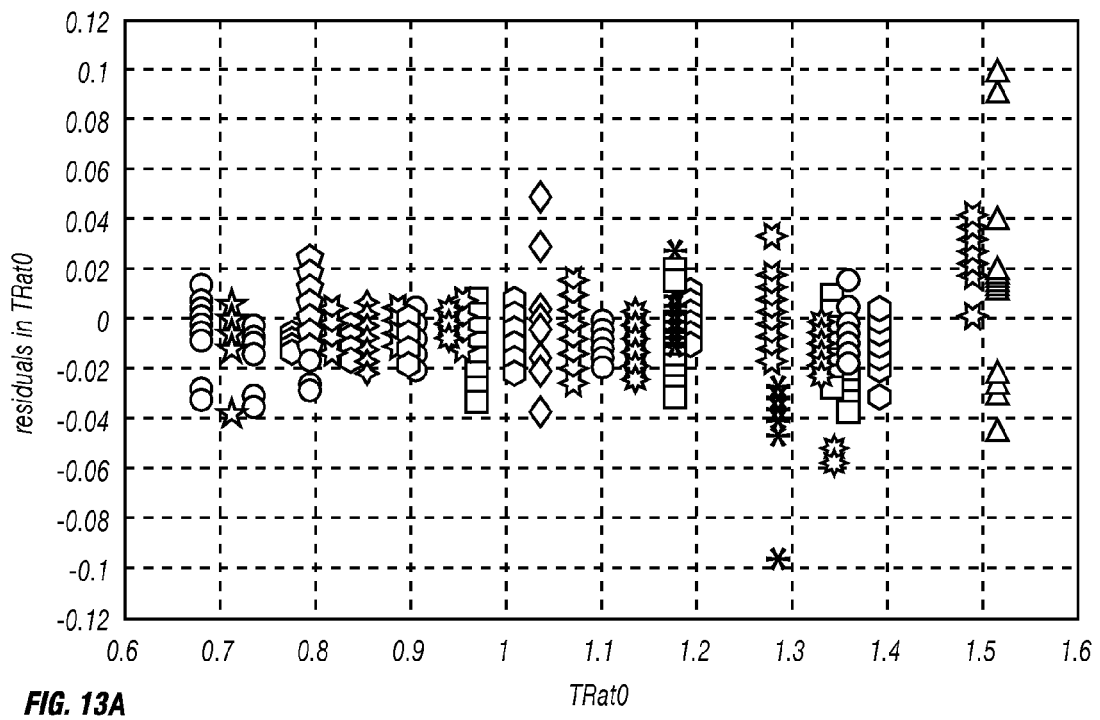
FIGS. 13A and 13B show different examples of residuals according to the corresponding functions of FIGS. 12A and 12B, respectively.
Figure 13B:
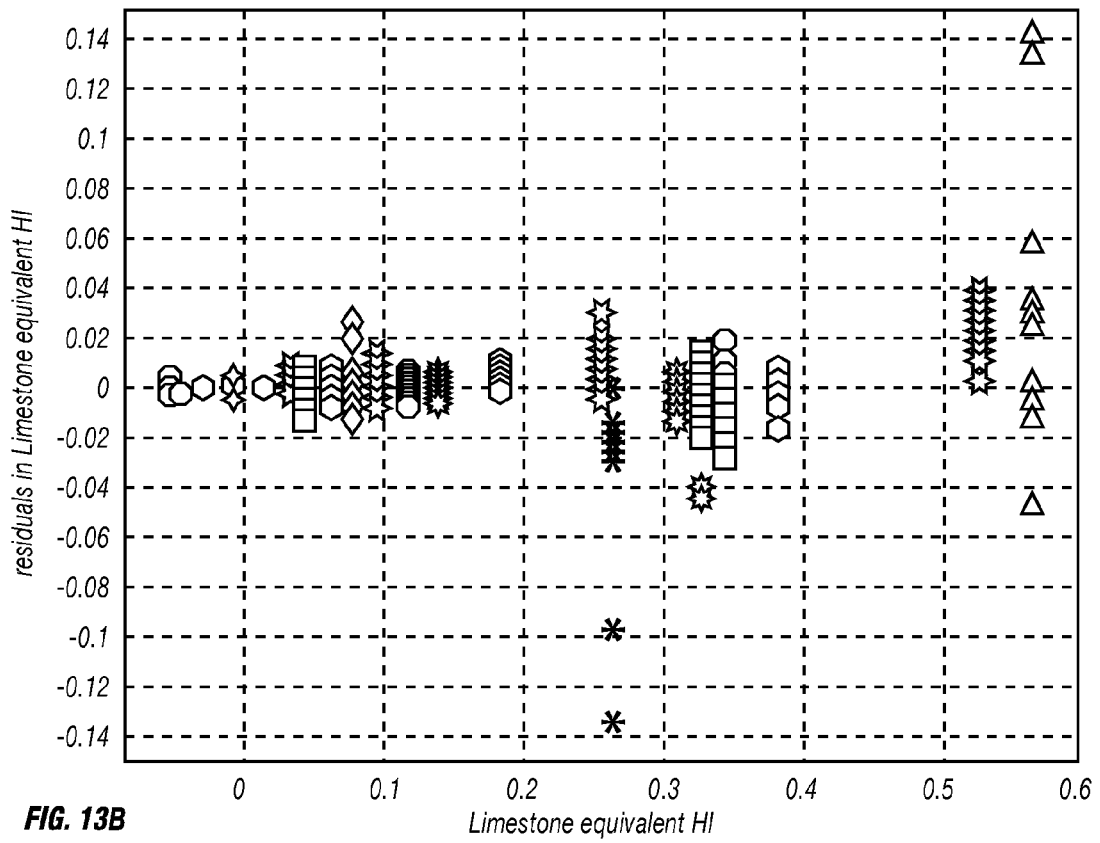

The $TRat_0$ linear approximation may also work for open hole conditions. The instrument response was simulated for a 5-inch diameter uncased wellbore (open hole) with 0 or 0.5 inch standoff (separation of the instrument housing from the wellbore wall in a wellbore filled with fresh water, and saline solution (100 ppk or 250 ppk), bentonite mud, hematite mud, or barite mud. In open hole, the $TRat_0$ was defined as the TRat in fresh water-filled wellbore without any standoff. FIG. 13A shows the accuracy of this approximation in the same way as FIG. 12A. Residuals are shown in FIG. 13B in a manner similar to that shown in FIG. 12B. The approximation appears to be very good except for 100 p.u. water and H&H shale. The two extreme outliers correspond to heavy barite mud in the borehole (0 or 0.5 inch standoff). Therefore, one could easily apply this approach to an open hole neutron-gamma porosity measurement. Similarly, this example can also be applied to logging while drilling (LWD) measurements.

So far, the explanation of the present example has been limited to how the two methods (detector gate and neutron burst timing to substantially eliminate the wellbore salinity effect and $TRat_0$ linear approximation to separate the wellbore and formation response) work for the detector count rate ratio, which requires two or more gamma-ray detectors. Following will be explained how the two methods work for individual detector count rates, which can be normalized by a neutron monitor detector. The individual detector count rate is defined as a sum of the time spectrum, as shown in FIG. 7, within a certain detector timing gate. Since the neutron output of a neutron generator tends to vary as a function of time in an unpredictable manner, the count rates are more useful if they are normalized by the neutron source output, e.g., the number of counts/$10^8$ neutrons emitted by the source. The neutron output can be measured by a neutron monitor detector (not shown in the figures) disposed proximate the neutron source (see, e.g., U.S. Pat. Nos. 6,754,586 and 6,884,994 incorporated herein by reference).

Figure 14A:
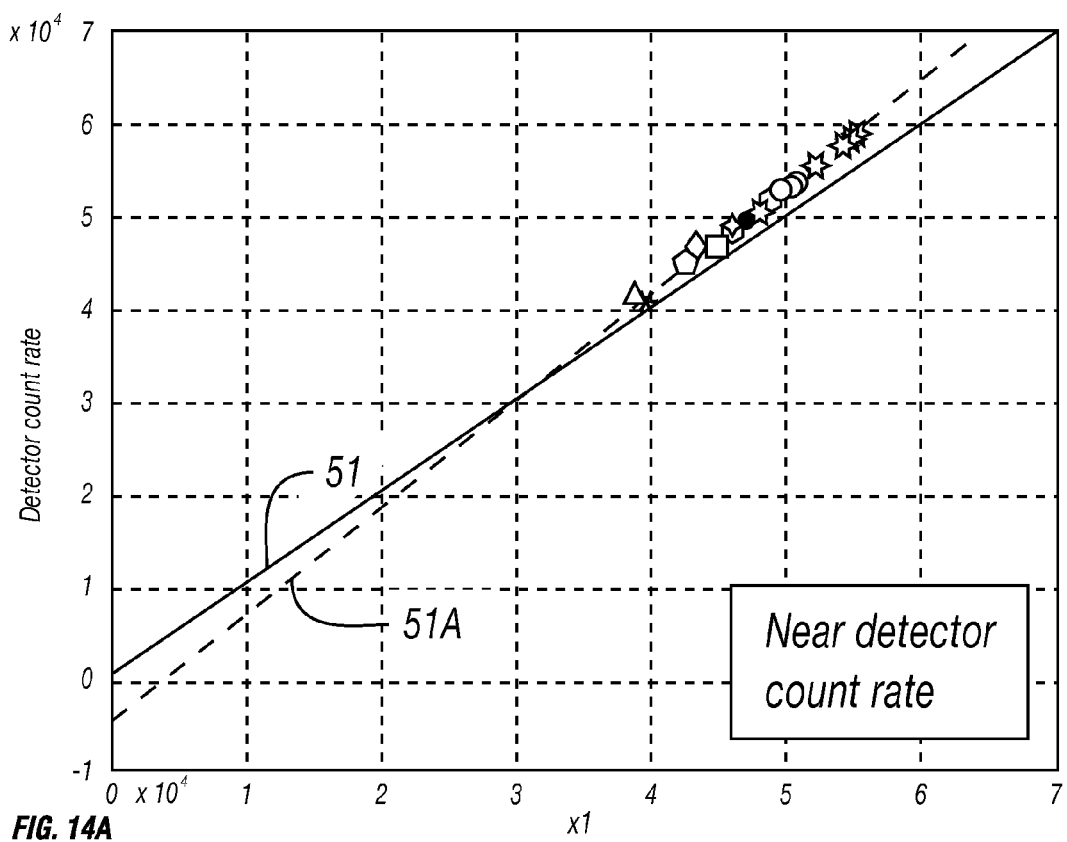
FIGS. 14A and 14B show graphs applying the $TRat_0$ linear approximation to single detector (near in FIG. 14A and far in FIG. 14B) count rates. The timing gate is the total decay time except for a small delay after each burst of the burst sequence shown in FIG. 7. The timing gate is the same with respect to the early TRat timing gate used shown in FIG. 8.
Figure 14B:
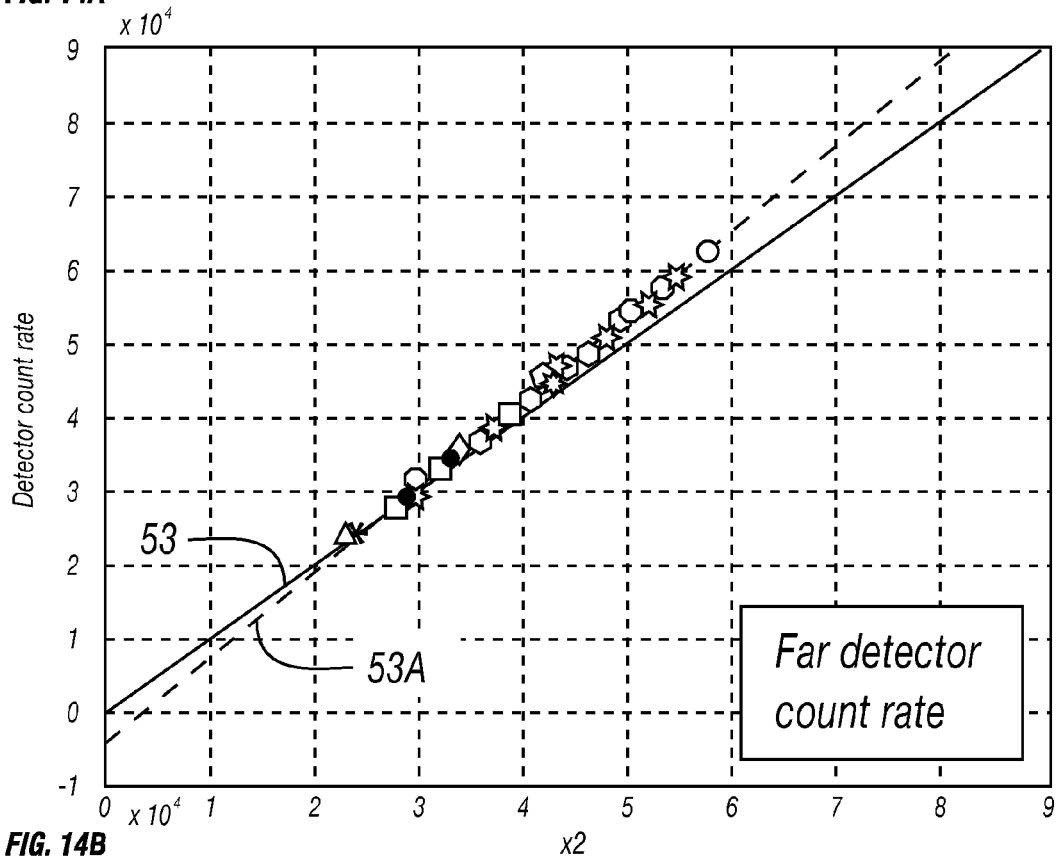

FIGS. 14A and 14B demonstrate the $TRat_0$ linear approximation for individual detector count rates, i.e., the near (FIG. 14A) and far (FIG. 14B) detectors. In this case, the denomination $TRat_0$ is not appropriate because there is no detector count rate ratio (not considering the exception of the normalization with the neutron monitor count rate). The same nomenclature is used for this method for consistency. For the near detector count rate, a parameter ×1 may be defined as the near count rate in the case of an 8-inch diameter wellbore having 5.5-inch OD casing, with 4.95-inch casing ID, and fresh water in the wellbore. The near detector count rate is plotted for the same conditions except 250-ppk water in the wellbore against ×1 in FIG. 14A. The black line is the 45-degree diagonal line and the green line is a linear fit through the data. The near detector count rate appears to be a linear function of ×1. Similarly, the far detector count rate may also be a linear function of variable ×2, which is defined as the far count rate in the case of an 8-inch diameter wellbore having 5.5-inch OD casing, with 4.95-inch casing ID, and fresh water in the wellbore, as shown in FIG. 14B. Although FIG. 14A and FIG. 14B only demonstrate linearity in one borehole condition, the two count rates can be approximately written as a linear function of ×1 and ×2 in a wide range of realistic borehole conditions, as shown in Equation 3. This is very similar to the $TRat_0$ linear approximation for detector count rate ratios.

$$CountRate_1 = a_1(BH) \cdot x_1 + b_1(BH)$$

$$CountRate_2 = a_2(BH) \cdot x_2 + b_2(BH) \tag{3}$$

Figure 15:
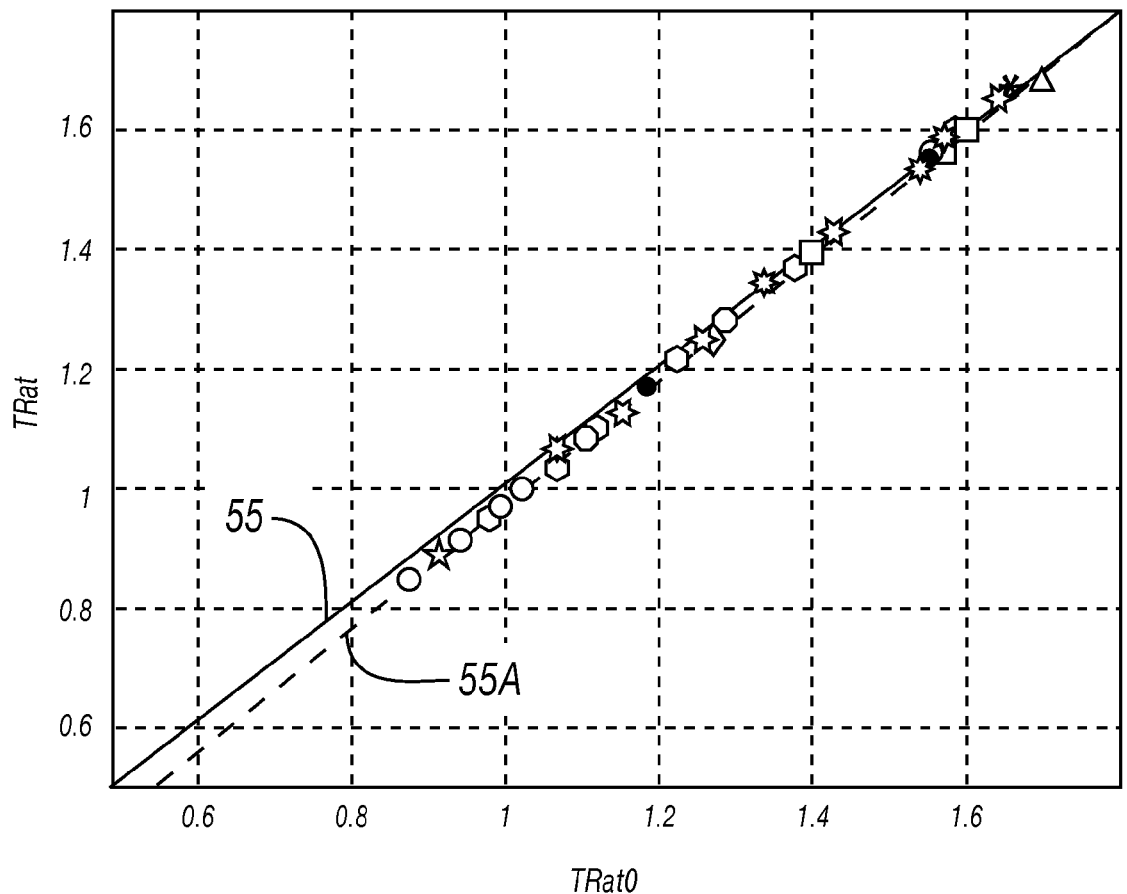
FIG. 15 shows a graph verifying the $TRat_0$ linear approximation for the early TRat.
Figure 16A:
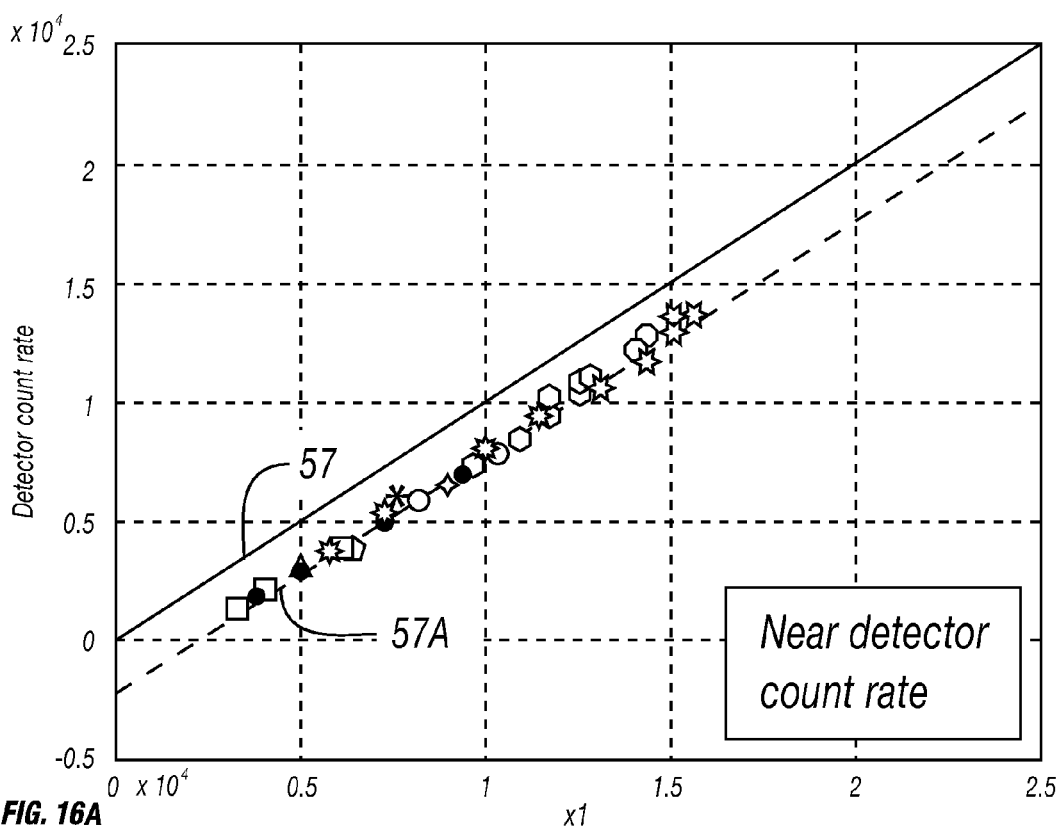
FIGS. 16A and 16B show, respectively applying the $TRat_0$ linear approximation to single detector count rates, near in FIG. 16A and far in FIG. 16B. The timing gate is from 130 µs after the last burst in FIG. 7 to the end of the detected gamma ray decay.
Figure 16B:
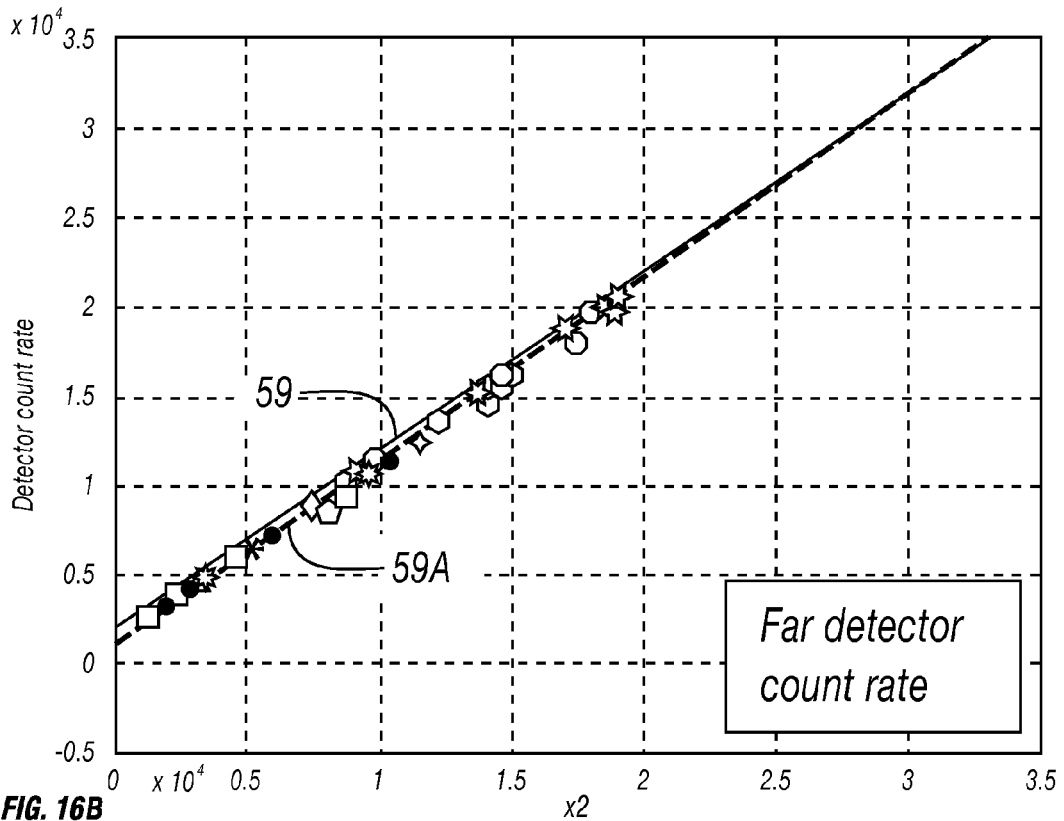

The timing gate for the count rates shown in FIGS. 14A and 14B may be the same gate as the early TRat used previously in FIG. 8. It has already been explained when taking count rate ratio between two detectors, it is possible to cancel the wellbore salinity effect. However, there will still be wellbore salinity effect in individual detector count rates. In this case (using selected timing gates), the slopes or gains (a1 and a2 in Equation 3) may be functions of wellbore salinity but are very similar for the near and far detector count rates with the condition of 250-ppk borehole water. The offsets (b1 and b2 in Equation 3) may also be functions of wellbore salinity but are very small compared to the count rates. Therefore, when taking a detector count rate ratio, it is possible to cancel the wellbore salinity effect, as shown in Equation 4. FIG. 15 confirms the detector count rate ratio based on the two individual count rates (FIGS. 12A and 12B) is approximately equal to $TRat_0$ (which is defined as the ratio of ×1 and ×2).

$$TRat = \frac{CountRate_1}{CountRate_2} = \frac{a_1(BH) \cdot x_1 + b_1(BH)}{a_2(BH) \cdot x_2 + b_2(BH)} \approx \frac{a_1(BH) \cdot x_1}{a_2(BH) \cdot x_2} \approx \frac{x_1}{x_2} = TRat_0 \tag{4}$$

Without suitably selected gate timing, the $TRat_0$ linear approximation can still be applied to individual detector count rates. Similar to FIGS. 12A and 12B, FIGS. 16A and 16B demonstrate how the foregoing works for a late timing gate, which is from 130 μs after the last burst in the sequence shown in FIG. 7 to the end of the gamma ray decay to background levels. The individual count rates are still approximately a linear function of the parameter x (which is defined as the detector count rate in a predetermined standard borehole condition). Thus, for individual detector count rates, the separation of borehole and formation response is possible for any timing gate based on the linear model (Equation 3). A possible disadvantage of using individual detector count rate (relative to detector ratio) is that the wellbore salinity effect cannot be canceled by optimizing the timing gate. The gain and offset (a and b in Equation 3) are function of wellbore conditions including wellbore salinity. Thus, this approach may require more complex corrections.

Figure 17:
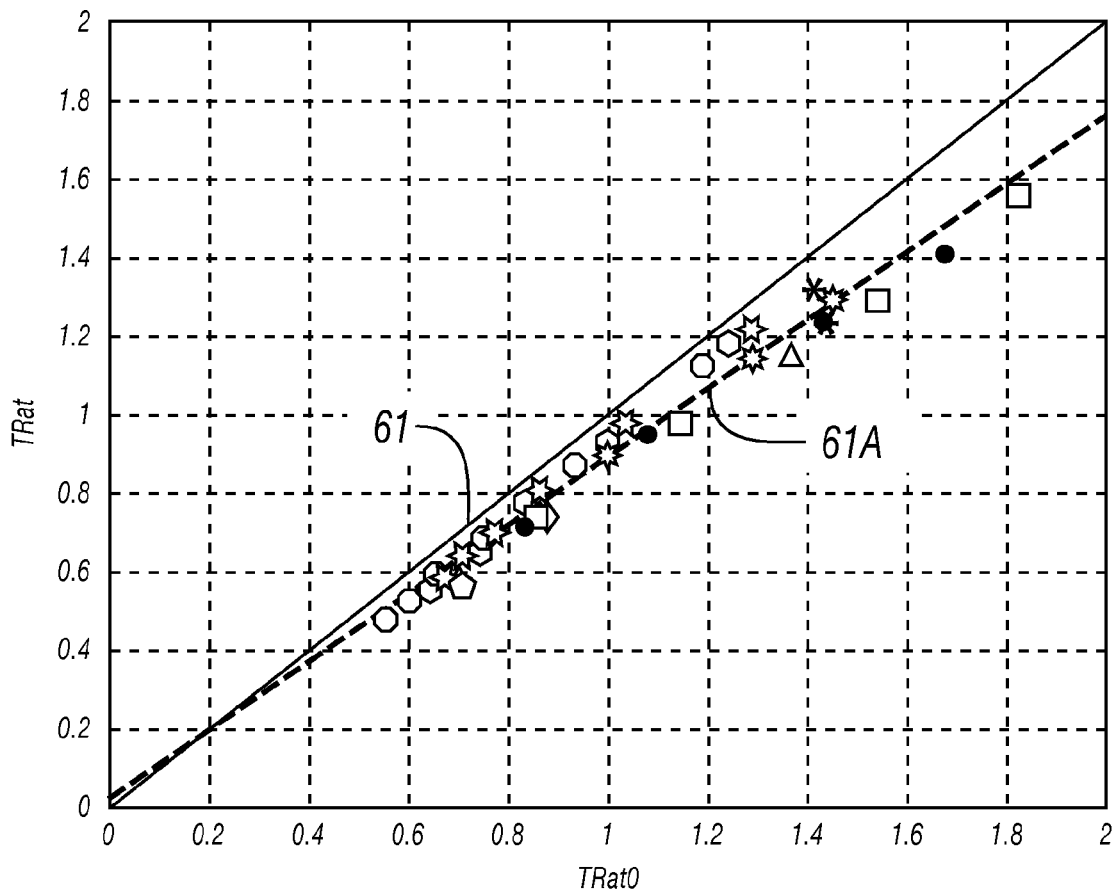
FIG. 17 shows a graph for verifying the $TRat_0$ linear approximation for a late TRat, with the timing gate from 130 µs after the last burst in FIG. 7 to the end of the detected gamma ray decay.

FIG. 17 shows that the slopes for the two individual count rates are not close and the offsets are not always small for a late timing gate. Thus, when taking ratios, one can not only not cancel the wellbore salinity effect, but also note that TRat is not a linear function of $TRat_0$ as shown in FIG. 17. However, one may use Equation 5 to describe the TRat response and separate the borehole and formation responses. In this case, one cannot define a parameter $TRat_0$ in a standard wellbore condition, but one can define two parameters ×1 and ×2 as the two individual detector count rates in a standard borehole condition. TRat is a function of ×1 and ×2, but the model is not linear. The two gains (a1 and a2) and two offset (b1 and b2) are functions of borehole conditions including borehole salinity. This basically is a modified $TRat_0$ linear approximation method. Similar principles can still be applied but they may be more complex. BH in Eq. (5) represents the wellbore conditions under which a and b are determined.

$$TRat = \frac{a_1(BH) \cdot x_1 + b_1(BH)}{a_2(BH) \cdot x_2 + b_2(BH)} \tag{5}$$

The invention is described with reference to an example with two axially spaced apart gamma-ray detectors. In other examples, more than two gamma ray detectors at different axial spacings may be used.

Figure 18:
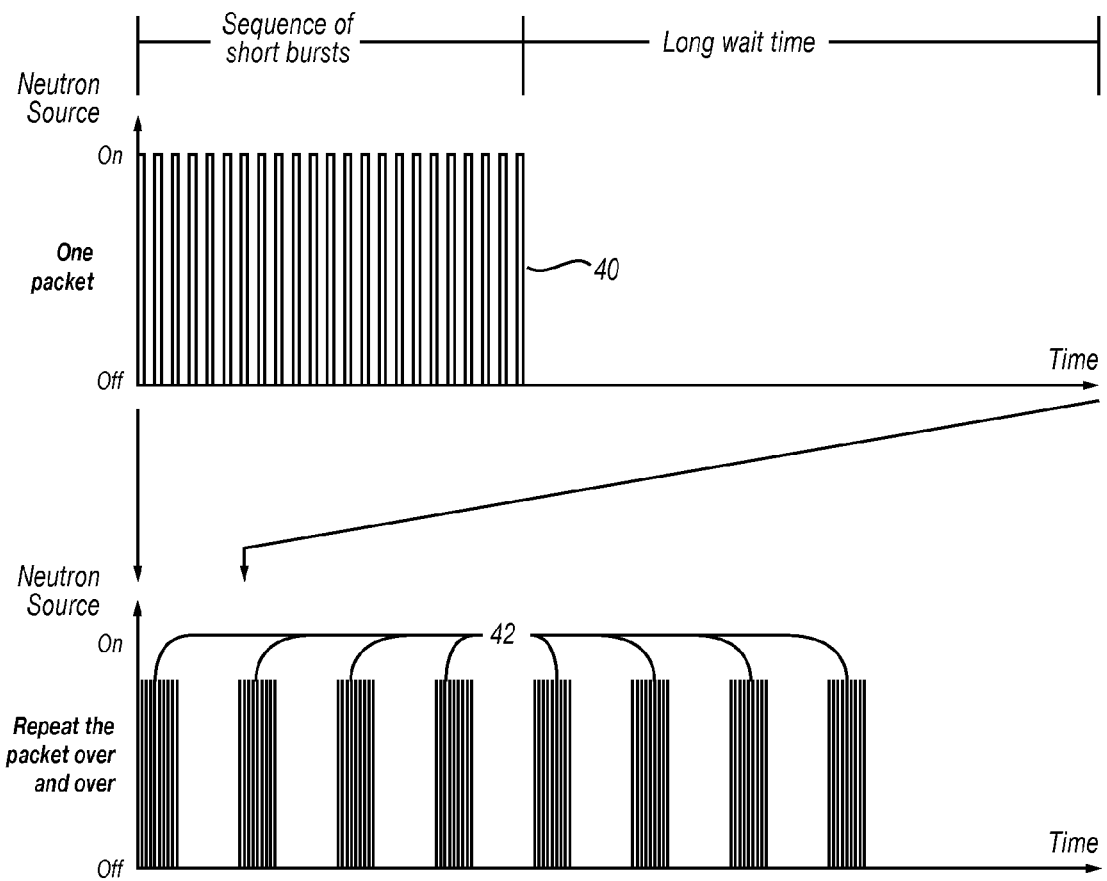
FIG. 18 shows an example neutron burst timing sequence.

Example implementations of the two foregoing processes will now be explained with reference to FIGS. 18-22. FIG. 18 shows a single neutron source burst sequence, e.g., with burst duration of about 20 μs and wait time between bursts of about 30 μs. After a selected number of bursts in a sequence, the source is switched off until the gamma ray counting rate has decayed essentially to background radiation levels. In one example the time interval after the last burst may be about 1000 μs before the initiation of the next burst sequence. Gamma rays may be detected in selected time intervals, e.g., during the wait time between successive neutron bursts and in the time interval between the last burst and the initiation of the next burst sequence. The lower part of FIG. 18 shows that the burst/wait time sequence 42 may be repeated a number of times to enhance statistical precision.

Referring to FIG. 19, the numbers of detected gamma rays may then be summed or stacked over all the detection time gates, as shown at 50. The stacked, detected numbers of gamma rays over all the detection time gates may be used to calculate TRat. At 52, this is shown as the sum of the detected gamma rays in the time gate of the first detector divided by the sum of the detected gamma rays in the same time gate of the second detector. Depending on the care with which the detection time gate is selected, the gamma ray counts may be substantially free of effects of wellbore salinity.

FIG. 20 illustrates the selected gamma ray detection time gates, wherein 44C indicates a short delay after the end of the neutron burst and detection 44A takes place after the end of each neutron burst. Timing gate 44B follows the end of the last neutron burst, separated by a short delay, and ends when the gamma ray detection has decayed essentially to background levels (e.g., 1000 μs from the end of the last neutron burst in the burst sequence). For the purpose of determining TRat the counts 44B and in all gates 44A are summed. This represents the sum of the early and late time detected gamma rays.

Figure 20A:
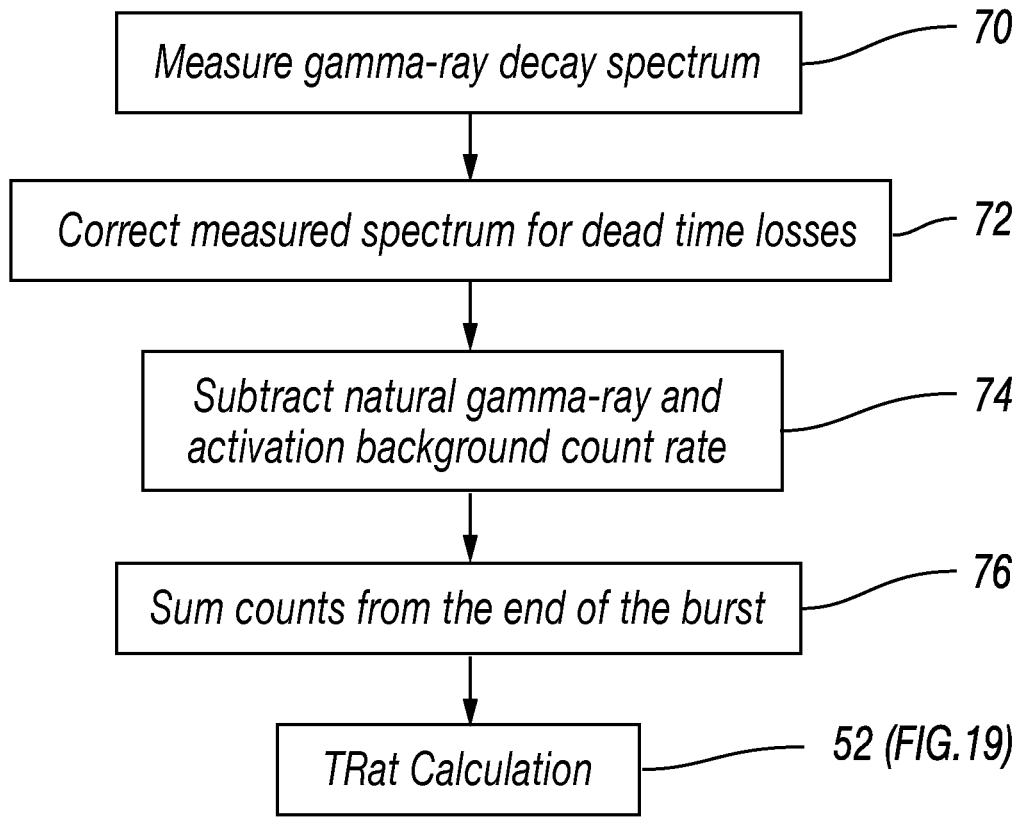
FIG. 20A shows an example process flow for use with a practical well logging instrument.

FIG. 20A shows example signal processing for the determination of the counts that are being used to determined TRat using a practical well logging instrument as shown in FIG. 1. The gamma-ray time decay spectrum 70 may be acquired in a multichannel counter as a function of time in the neutron pulsing sequence. The detector experiences dead time after each detection event, i.e. a time during which, it cannot detect another gamma ray immediately following the event that is being processed. In particular, at high count rates this will lead to a counting loss, which as is well known in the art requires a "dead time correction". Following the acquisition, the counts in each time bin are corrected for dead time 72. Next at 74, the contribution from gamma-rays not related to neutron capture is subtracted. Those gamma-rays may be caused by the natural radioactivity of the formation and by the activation of the formation, borehole or downhole tool by the transmutation of isotopes into radioactive isotopes by neutron reactions. The natural and activation gamma-rays form a quasi-constant background, which is unrelated to the gamma-rays from neutron capture and the counts need to be removed from the total. The counts after the correction for dead time 72 and gamma ray background 74 are summed over the time gates 76 indicated in FIG. 20 and enter the TRat calculation 52 (FIG. 19).

Figure 21:
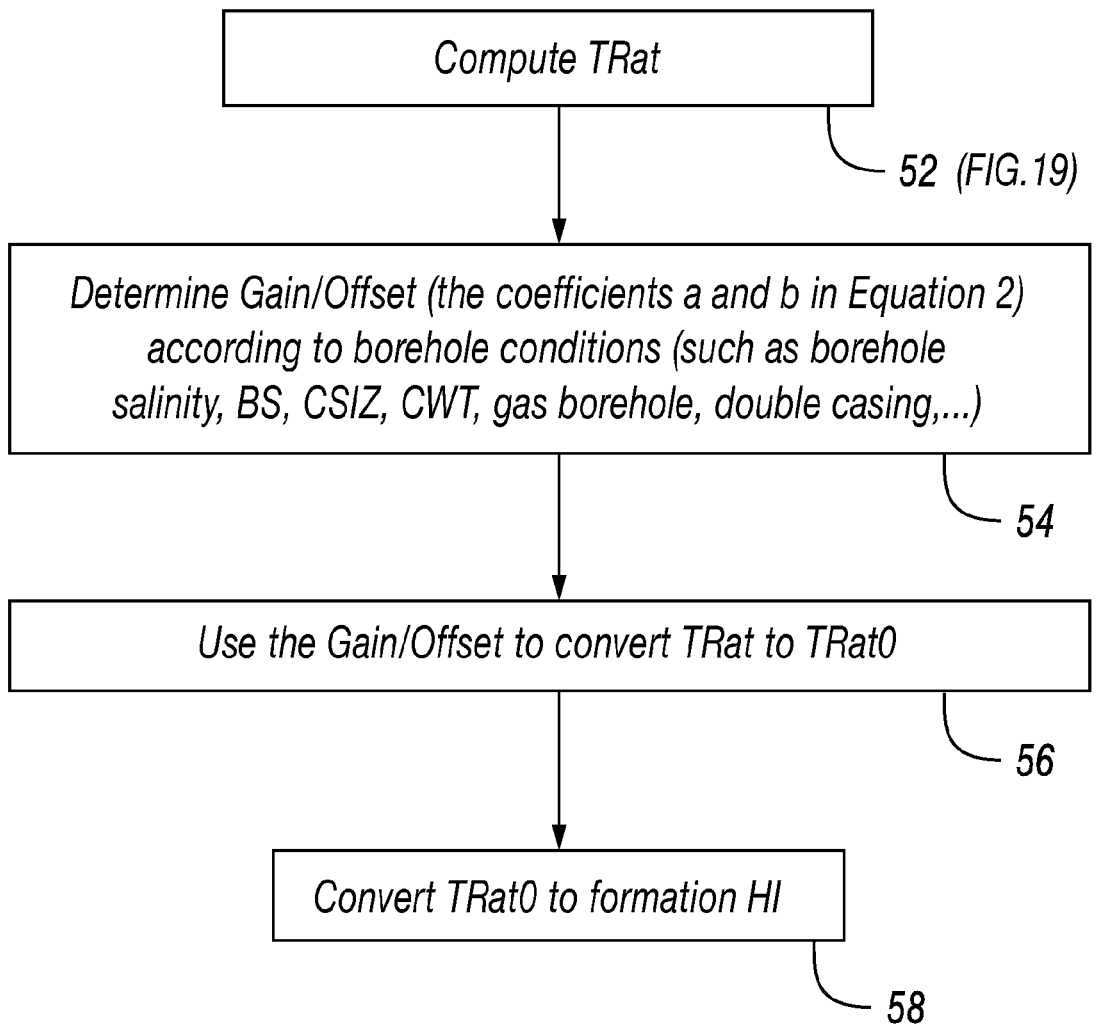
FIG. 21 shows a flow chart of an example conversion of TRat into hydrogen index.

In FIG. 21, at 52, TRat is calculated as explained above. At 54, the gain and offset of a linear function (the coefficients a and b in Eq. 2) can be determined according to wellbore conditions (such as wellbore diameter, casing OD, casing weight, casing ID, gas filled wellbore, double casing, etc.). The values of the gain and offset may be used to convert TRat to $TRat_0$, which is shown at 56. $TRat_0$ may be used to calculate a hydrogen index (HI) at 58. HI is related to formation porosity after correction for formation lithology and fluid content in the pore spaces of the formation.

Figure 22:
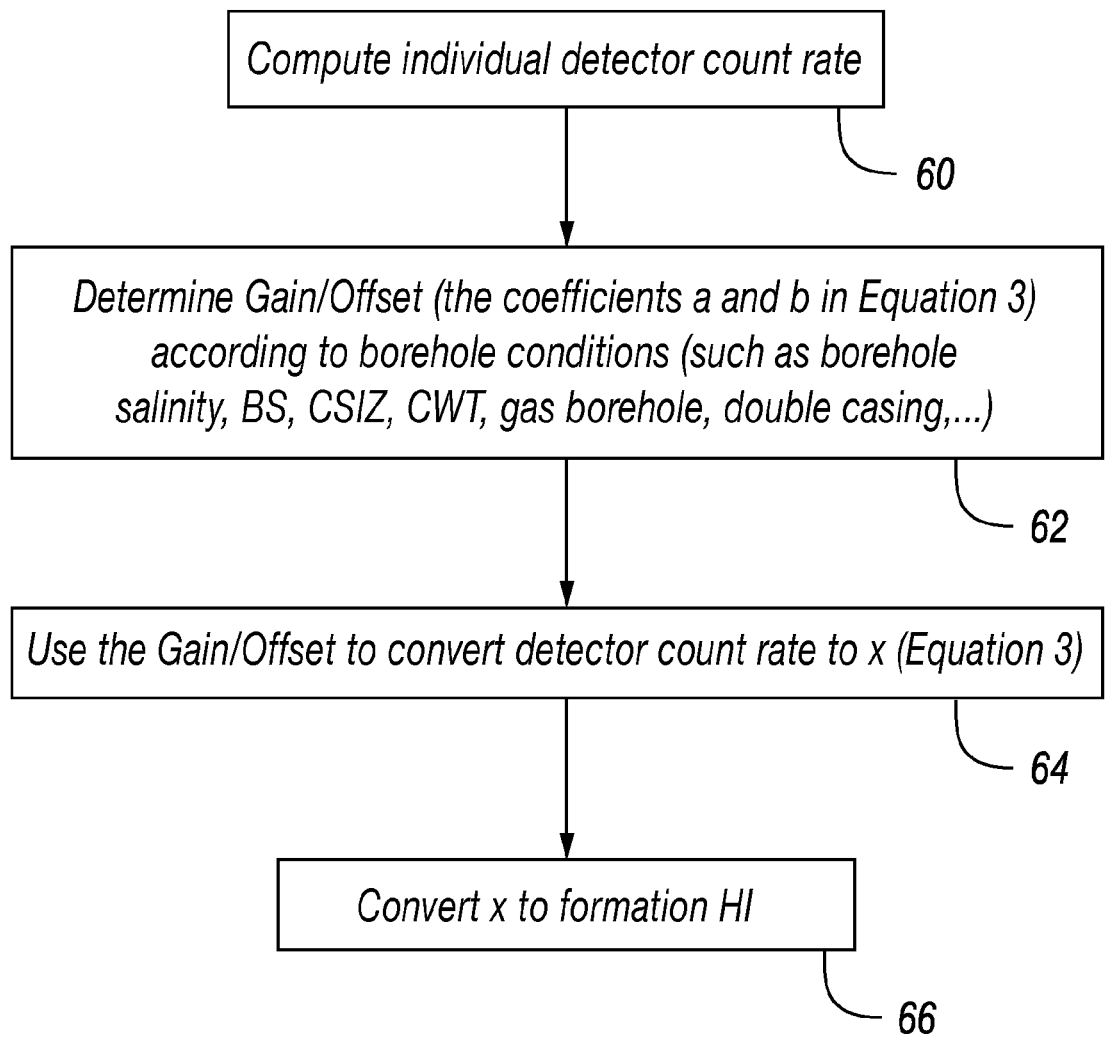
FIG. 22 shows a flow chart of an example conversion of individual detector counts into hydrogen index.

Referring to FIG. 22, the stacked, detected numbers of gamma rays over all the detection time gates, shown at 60, may also be used to calculate an individual detector count rate without taking any ratio with other gamma detectors. The individual detector counts can be used to compute the formation hydrogen index, as shown at 66 in FIG. 22. Depending on the care with which the detection time gates are selected, the calculated individual detector count rate may be substantially free of effects of wellbore salinity. In reality, because the neutron source output varies, the individual detector count rate can be normalized by a neutron monitor measurement to cancel the effects of variation in neutron source output.

In FIG. 22, at 60, detected gamma ray counts in one time gate may be summed over all the bursts in the plurality of burst sequences (42 in FIG. 20) and the sums individually counted for each gamma ray detector. At 62, the gain and offset of a linear function (the coefficients a and b in Eq. 3) are determined according to wellbore conditions (such as wellbore diameter, casing OD, casing weight, casing ID, gas filled wellbore, double casing, etc.). At 64, the gains and offsets for each detector function and individual detector count rate may be input to Eq. 3 to determine, for each gamma ray detector, a value of x. At 66 one or more of the values of x may be used to determine hydrogen index. HI is related to porosity as explained above.

Figure 23:
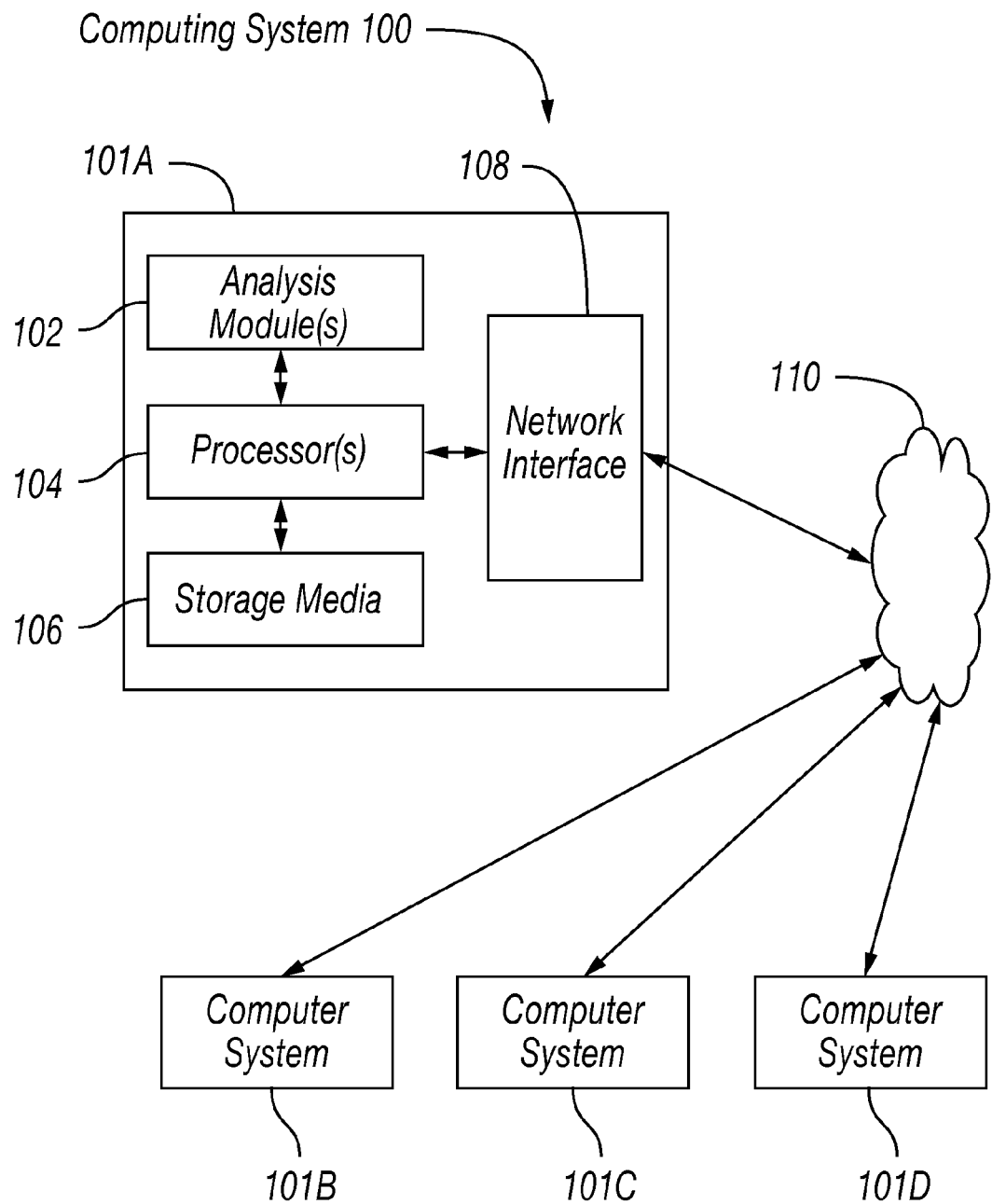
FIG. 23 shows an example computer system that may be used in some embodiments to implement example methods according to the present disclosure.

FIG. 23 depicts an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks depicted in FIG. 23. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 23 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 23, and/or computing system 100 may have a different configuration or arrangement of the components depicted in FIG. 23. The various components shown in FIG. 23 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for pulsed neutron well logging of a subsurface formation, comprising:
   (a) irradiating the formation with a plurality of bursts of neutrons of a group of selected durations;
   (b) detecting gamma rays resulting from interaction of the neutrons during a group of selected time gates which contains at least one early gamma ray count, comprising gamma rays detected between 0 and 70 microseconds from a neutron burst and at least one late gamma ray count consisting essentially of gamma rays detected between 70 and infinity microseconds from the neutron burst, the early and late gamma ray counts detected at at least two axially spaced apart locations from a position of the irradiating;
   (c) in a computer, forming a weighted sum of the numbers of gamma rays detected in each of the time gates at each of the axially spaced apart locations;
   (d) in the computer, determining a ratio of the weighted sum of detected gamma rays at a first axial spacing to the weighted sum at a second axial spacing; and
   (e) in the computer, using the ratio to determine a hydrogen index of the subsurface formation, wherein the group of time gates, burst length, or number of bursts are optimized in a computer model to reduce the wellbore salinity effect on the ratio.

2. The method of claim 1 further comprising:
   (f) repeating (a) and (b) for a selected number of times;
   (g) in the computer, forming weighted sums of gamma rays detected in each of the time gates;
   (h) in the computer, determining a ratio of the weighted-summed numbers of detected gamma rays at a first axial spacing to the weighted-summed numbers at a second axial spacing; and
   (i) in the computer, using the ratio to determine a hydrogen index of the subsurface formation.

3. The method of claim 1, in which the weights in the weighted sum are all equal.

4. The method of claim 1, in which the group of selected time gates merges into a single time gate.

5. The method of claim 1, in which at least one of the neutron burst lengths is shorter than 50 µs.

6. The method of claim 1, in which the group of selected time gates is selected to be different for each detector before determining the ratio.

7. The method of claim 1, in which weights used to compute the weighted sums are different for different detectors before determining the ratio.

8. The method of claim 1, in which the early time gate may contains some inelastic gamma ray counts contamination, in which the total inelastic gamma ray counts are less than 5% of the total gamma ray counts in all the gates.

* * * * *